(12) United States Patent
Behrends et al.

(10) Patent No.: US 11,694,282 B2
(45) Date of Patent: Jul. 4, 2023

(54) COMPUTER IMPLEMENTED BLOCKCHAIN-BASED SYSTEM FOR AGRICULTURAL PRODUCTS

(71) Applicant: FARMER CONNECT SA, Geneva (CH)

(72) Inventors: David Behrends, Geneva (CH); Diana Kaliff, Geneva (CH); Darby McNee Bodden, Geneva (CH); Fabian Portmann, Geneva (CH); Jaqueline Tomasini Castro, Geneva (CH)

(73) Assignee: FARMER CONNECT SA, Geneva (CH)

( * ) Notice: Subject to any disclaimer, the term of this patent is extended or adjusted under 35 U.S.C. 154(b) by 0 days.

(21) Appl. No.: 17/847,819

(22) Filed: Jun. 23, 2022

(65) Prior Publication Data

US 2022/0366515 A1    Nov. 17, 2022

Related U.S. Application Data

(63) Continuation of application No. PCT/EP2020/087827, filed on Dec. 23, 2020.

(30) Foreign Application Priority Data

Dec. 23, 2019 (GB) ..................... 1919145
Jan. 6, 2020  (GB) ..................... 2000120
(Continued)

(51) Int. Cl.
*G06Q 50/02* (2012.01)
*H04L 9/00* (2022.01)
*G06Q 10/0833* (2023.01)

(52) U.S. Cl.
CPC ......... *G06Q 50/02* (2013.01); *G06Q 10/0833* (2013.01); *H04L 9/50* (2022.05)

(58) Field of Classification Search
CPC ............ G06Q 10/083; G06Q 10/0832; G06Q 10/0833; G06Q 10/0853; G06Q 10/0837; G06Q 10/0838
See application file for complete search history.

(56) References Cited

U.S. PATENT DOCUMENTS 10,491,608 B1    11/2019  Tatge et al.
2018/0060496 A1*  3/2018  Bulleit ................. H04L 9/0643
(Continued)

FOREIGN PATENT DOCUMENTS

EP    3540662 A1    9/2019
WO   2018163044 A1  9/2018

OTHER PUBLICATIONS

De Caria, Riccardo. "A digital revolution in international trade? The international legal framework for blockchain technologies, virtual currencies and smart contracts: challenges and opportunities." (Year: 2017).*

(Continued)

*Primary Examiner* — Emmett K. Walsh
(74) *Attorney, Agent, or Firm* — Saul Ewing LLP

(57) ABSTRACT

A platform built on blockchain that is designed to help increase traceability, efficiency and fairness in agricultural supply chains, such as the coffee, cocoa, tea, sugar, grains and fruit supply chains. The platform includes a Self-Sovereign Identity solution, a new form of digital identity built on distributed ledger technology. Farmers, wholesalers, traders and retailers can interact more efficiently using comprehensive, near real-time access to this data, and consumers can have new insights about the origins of the products they consume. The platform includes a consumer-facing application that pulls information directly from the blockchain and connects the final consumer, e.g. a coffee drinker, to farmers, traders, roasters and brands. The information is presented on an interactive map, allowing each (Continued)

Farmer Connect Ecosystem product to tell a story in a simple and scalable way. The app also presents sustainability projects in coffee communities and an opportunity for consumers to directly support them.

33 Claims, 45 Drawing Sheets

(30) Foreign Application Priority Data

| Jan. 22, 2020 | (GB) | 2000957 |
| Aug. 5, 2020 | (GB) | 2012157 |
| Oct. 9, 2020 | (GB) | 2016029 |
| Oct. 9, 2020 | (GB) | 2016030 |
| Oct. 9, 2020 | (GB) | 2016032 |
| Oct. 9, 2020 | (GB) | 2016033 |
| Oct. 9, 2020 | (GB) | 2016034 |
| Oct. 9, 2020 | (GB) | 2016036 |

(56) References Cited

U.S. PATENT DOCUMENTS

2018/0285810 A1* 10/2018 Ramachandran .... G06Q 10/087
2020/0019923 A1* 1/2020 Santhar .............. G06Q 10/0832

OTHER PUBLICATIONS

Zhao, Guoqing, et al. "Blockchain technology in agri-food value chain management: A synthesis of applications, challenges and future research directions." Computers in industry 109 (2019): 83-99. (Year: 2019).*

International Search Report, dated Jun. 2, 2021, issued in International Application No. PCT/EP2020/087827.

Segers, Lennard, et al., "The use of a blockchain-based smart import declaration to reduce the need for manual cross-validation by customs authorities", Digital government Research, ACM, 2 Penn Plaza, Suite 701, NY, NY 10121-0701; pp. 196-203 (Jun. 18, 2019) XP058438981.

* cited by examiner

FIG. 16

← DETAILS

Agronomy (Farm)
Organization Name

| Datapoint | Value |
|---|---|
| Datapoint | Value |
| Datapoint | Value |
| Datapoint | Value |
| Datapoint | Value |
| Datapoint | Value |

← PUBLIC PROFILE (+)

You have not published any public credentials.

← SELECT CREDENTIAL

Identity

| FL | First Last 22/04/2020 | > |
|---|---|---|

Farm Info

| | Agronomy (Farm) 22/04/2020 | > |
|---|---|---|
| | Agronomy (Soil and Fertilization) 14/03/2020 | > |
| | Farm Info 14/03/2020 | > |

← SELECT ATTRIBUTES

Agronomy (Farm)
Organization Name

Select the attributes you want publicly viewable.

| Date Issued | Value ☑ |
|---|---|
| Name of Farm/Business | Value ☑ |
| Min Altitude | Value ☑ |
| Med Altitude | Value ☑ |
| Max Altitude | Value ☑ |
| Main Crop | Value ☐ |
| Main Crop Varieties | Value ☐ |
| Number of Trees | Value ☐ |

PUBLISH

FARMER CONNECT
Farmer ID

- Exchanges
- Credentials
- Public Profile

Public Credentials                                        SAVE

Identity
▷ (JW) Joshua Welty                                          ⓘ
  ☑ First Name        Value
  ☑ Last Name         Value
  ☑ Phone Number      Value
  ☑ Merchant          Value Credentials
▷ ⊙ Farm Info                                                ⓘ
▷ ⊛ Agronomy (Soil & Fertilization)                          ⓘ
▷ ⊛ Agronomy (Farm)                                          ⓘ

Josh Welty
+1(234) 567-8901
LOGOUT   EN

FARMER CONNECT

Ralph Fangiao LOGOUT
Organization Name: Manager

← Farmer Details

Transaction Details ⊗

Exchange: Coffee Cherry - Robusta
50 KGM for 250 USD
Facility Name
Friday, March 6th 2020

| Purchase Order Number | Value |
|---|---|
| Lot Identifier | Value |
| Product ID | Value |
| Organization Name | Value |
| Facility Identifier | Value |
| Commission Event | Value |
| Purchase Order ID | Value |
| Commission Event ID | Value |
| Despatch Advice ID | Value |
| Payload ID | Value |

---

FARMER CONNECT

Ralph Fangiao LOGOUT
Organization Name: Manager

Farmers  Exchanges  Credentials  Merchants       Search Farmers   Invite Farmers

| NAME | PHONE NUMBER | PHONE TYPE | STATUS | | |
|---|---|---|---|---|---|
| Josh Welty | +1(234) 567-8901 | Flip Phone | Invited | Issue ▾ | Transaction ▾ |
| First, Last | +1(234) 567-8901 | Flip Phone | Invited | Farm Info / Agronomy (Farm) / Agronomy (Soil & Fertilization) | Transaction ▾ |
| First, Last | +1(234) 567-8901 | Flip Phone | Invited | Issue ▾ | Transaction ▾ |
| First, Last | +1(234) 567-8901 | Flip Phone | Invited | Issue ▾ | Transaction ▾ |

⊗
Are you sure you want to remove this farmer? All farm credentials will be revoked, and all contact data will be deleted.
[Cancel] [Remove]

COMPUTER IMPLEMENTED BLOCKCHAIN-BASED SYSTEM FOR AGRICULTURAL PRODUCTS

CROSS-REFERENCE TO RELATED APPLICATIONS

This is a bypass continuation of International Application No. PCT/EP2020/087827, filed on Dec. 23, 2020, which claims priority to GB Application No. 1919145.1, filed Dec. 23, 2019; GB Application No. 2000120.2, filed Jan. 6, 2020; GB Application No. 2000957.7, filed Jan. 22, 2020; GB Application No. 2012157.0, filed Aug. 5, 2020; GB Application No. 2016029.7, filed Oct. 9, 2020; GB Application No. 2016030.5, filed Oct. 9, 2020; GB Application No. 2016032.1, filed Oct. 9, 2020; GB Application No. 2016033.9, filed Oct. 9, 2020; GB Application No. 2016034.7, filed Oct. 9, 2020; and GB Application No. 2016036.2, filed Oct. 9, 2020, the entire contents of each of which being fully incorporated herein by reference.

FIELD OF THE INVENTION

This invention relates to a computer implemented blockchain-based system for agricultural products, such as coffee, cocoa, tea, grain, tobacco, and fruit.

PRIOR ART DESCRIPTION

Coffee drinkers today consume more than half a trillion cups per year, and as many as two-thirds of consumers aged 19-24 surveyed say they prefer to buy coffee that is sustainably grown and responsibly sourced. But despite progress by international certifying bodies, there still a lack of knowledge around the need for coffee farmers to earn a sufficient living for bringing their product to market. Farmers are also increasingly separated from end-consumers, have no control over their data, and face strong global competition. Farmers lack access to relevant information, have no control of their data, and experience considerable difficulties in establishing their creditworthiness so they can invest in their business.

The large, global supply chain makes coffee traceability difficult. Once grown, coffee beans make several stops, including at coops, exporters, shippers, importers, roasters, distributors, and retailers before finally reaching the consumer. Each participant in this complex system tracks in most cases only their small segment of the journey, and each uses its own systems to log data. This means that information about the product is fragmented. Trading smallholder commodities is paper and labour intensive, and it exposes companies to macro risks and legacy systems that make data homogenization, visualization and analysis a challenge.

Consumers look to brands to provide new, safe, responsibly sourced products, and younger generations demand proof. Consumers hoping to close the gap between their neighborhood barista and the farmer who grew their coffee currently have no solution. Equally, brand owners often lack a direct/vital and verifiable link to their customers.

These issues are common in numerous global agricultural markets, and this invention is therefore not restricted to coffee, but is applicable to many agricultural goods, such as cocoa, tea, grain, tobacco, fruit etc.

SUMMARY OF THE INVENTION

The invention is a computer implemented blockchain-based system for agricultural products as defined in the appended Claims. A consolidated list of key features is at Appendix 2. The invention is implemented in a system called the Farmer Connect™ system, which is described in depth in the following sections.

The Farmer Connect system offers a number of advantages:

1. Immediate operational savings/efficiencies: reduction in back and middle office costs through the removal of labour-intensive or duplicated tasks. This saving can be 30% for a typical coffee importer.

2 Digitalisation/uniformisation and better management of the entire supply chain: the Farmer Connect overlay allows better controls, better oversight and consistency across multiple IT platforms, and the removal of a significant element of risk (re: human mistakes and/or fraud).

3 Allowing the issuance of trustworthy sustainability reports: particularly relevant for the largest global clients which now require these reports to be correct, timely and auditable. Relevant for regulators as well.

4. Allowing non-specialty coffee to regain an element of premium: empowering the farmers and merchants to sell more than a commoditised coffee, but a premium product based on the data-enabled transaction platform that enables a direct connection between farmer/merchant and the ultimate end-consumer.

BRIEF DESCRIPTION OF THE DRAWINGS

The drawings illustrate the Farmer Connect™ system.

Figure 16:
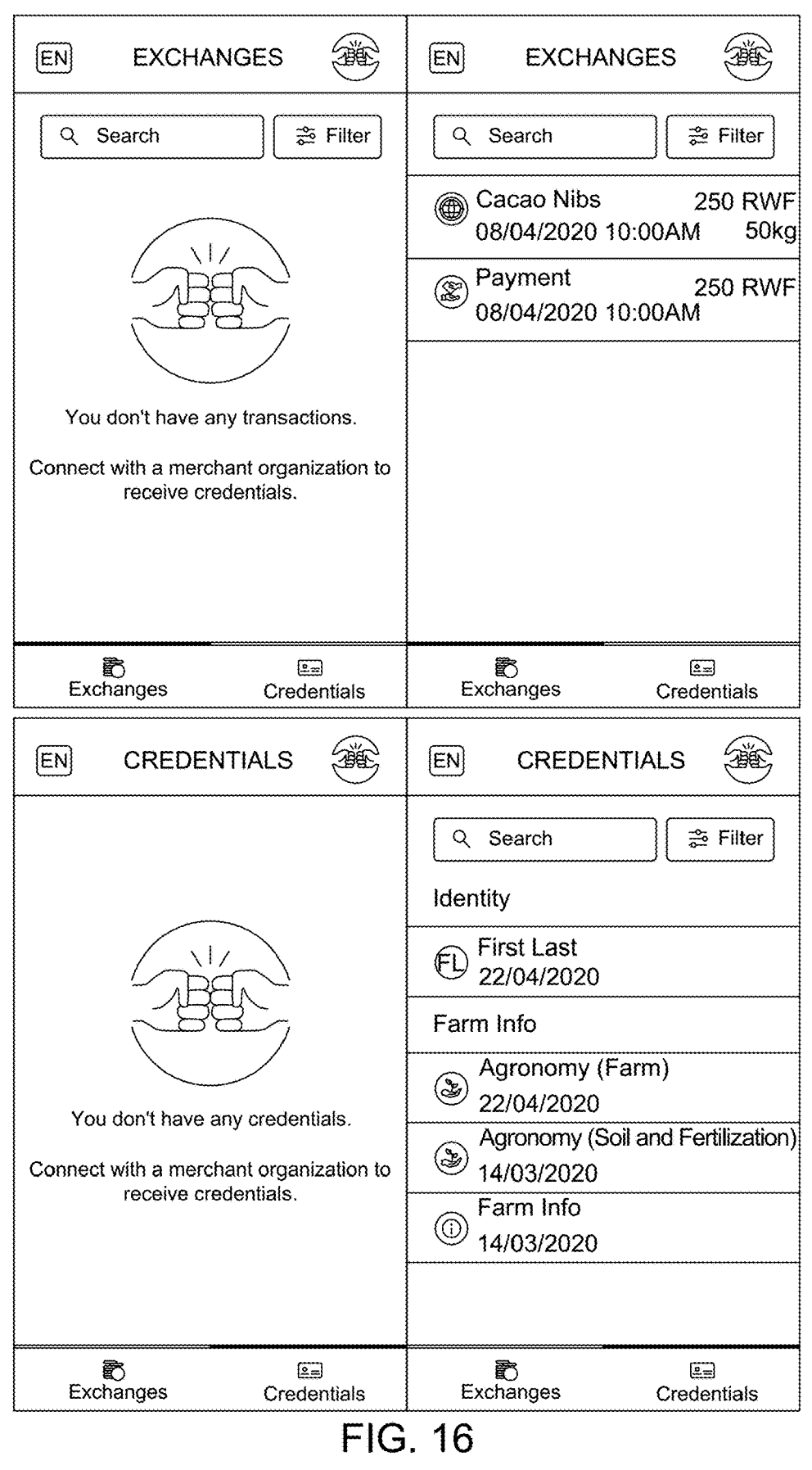
Figure 20:
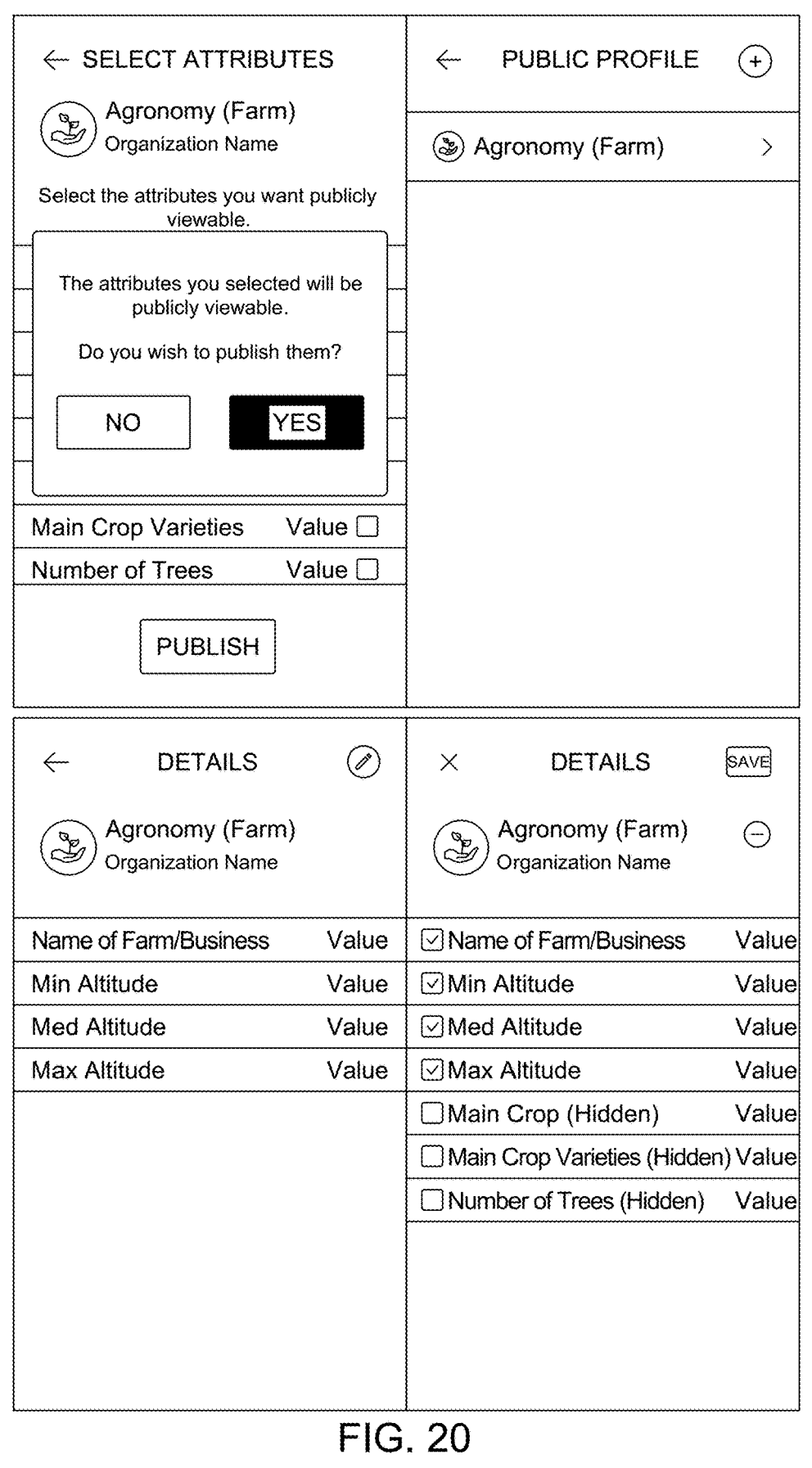
Figure 21:
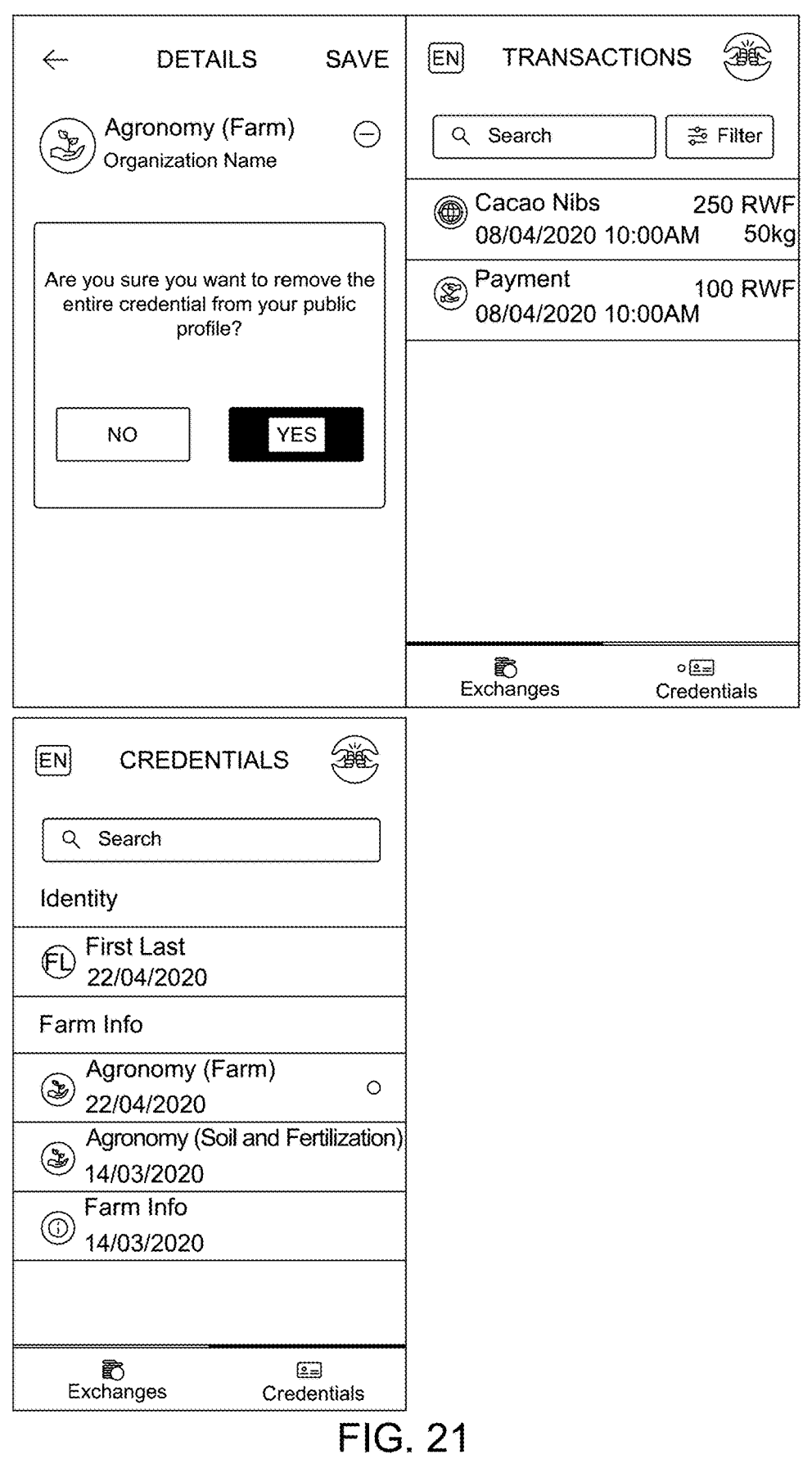

FIGS. 15-21 are screenshots of the Mobile Wallet application.

Figure 23:
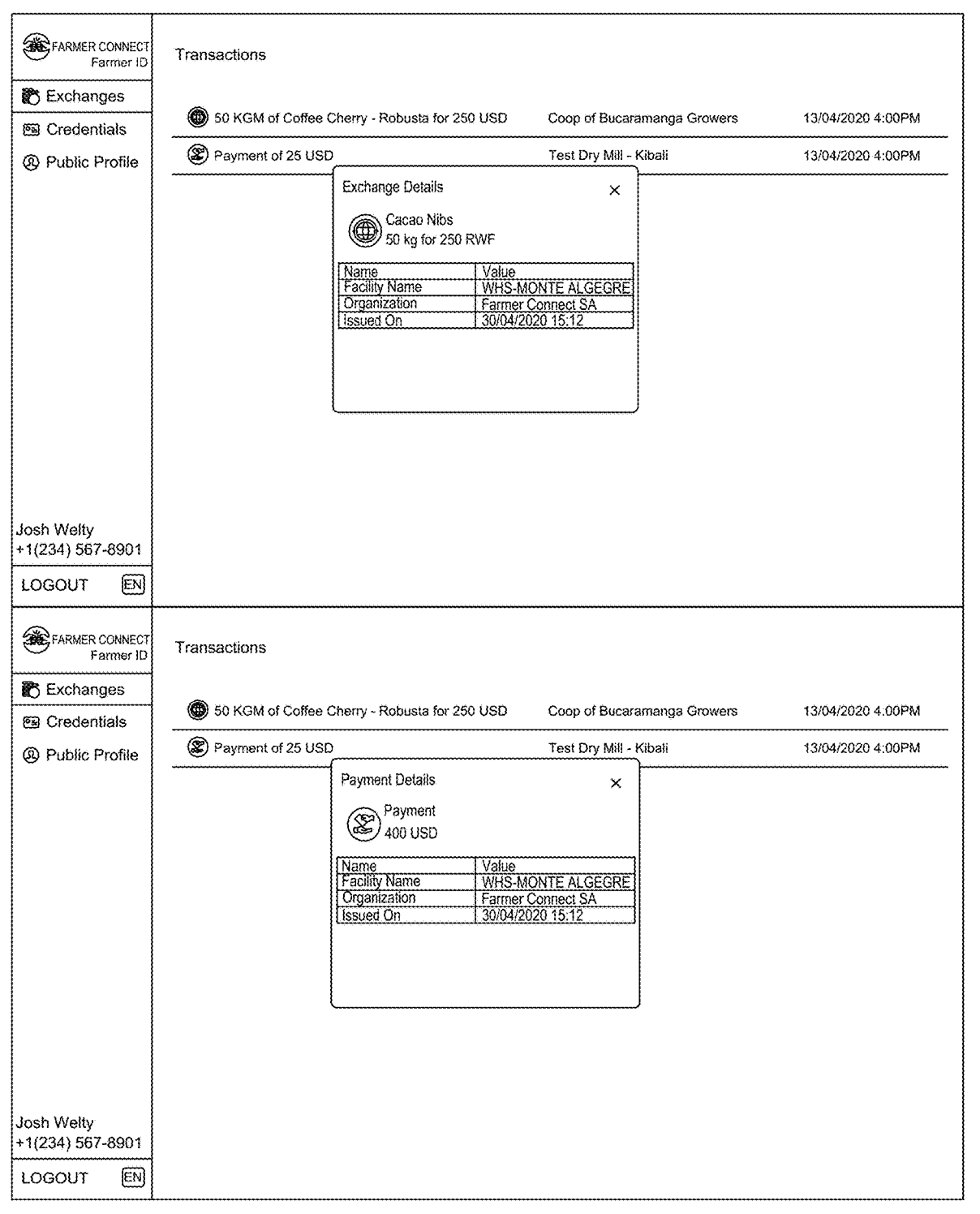
Figure 25:
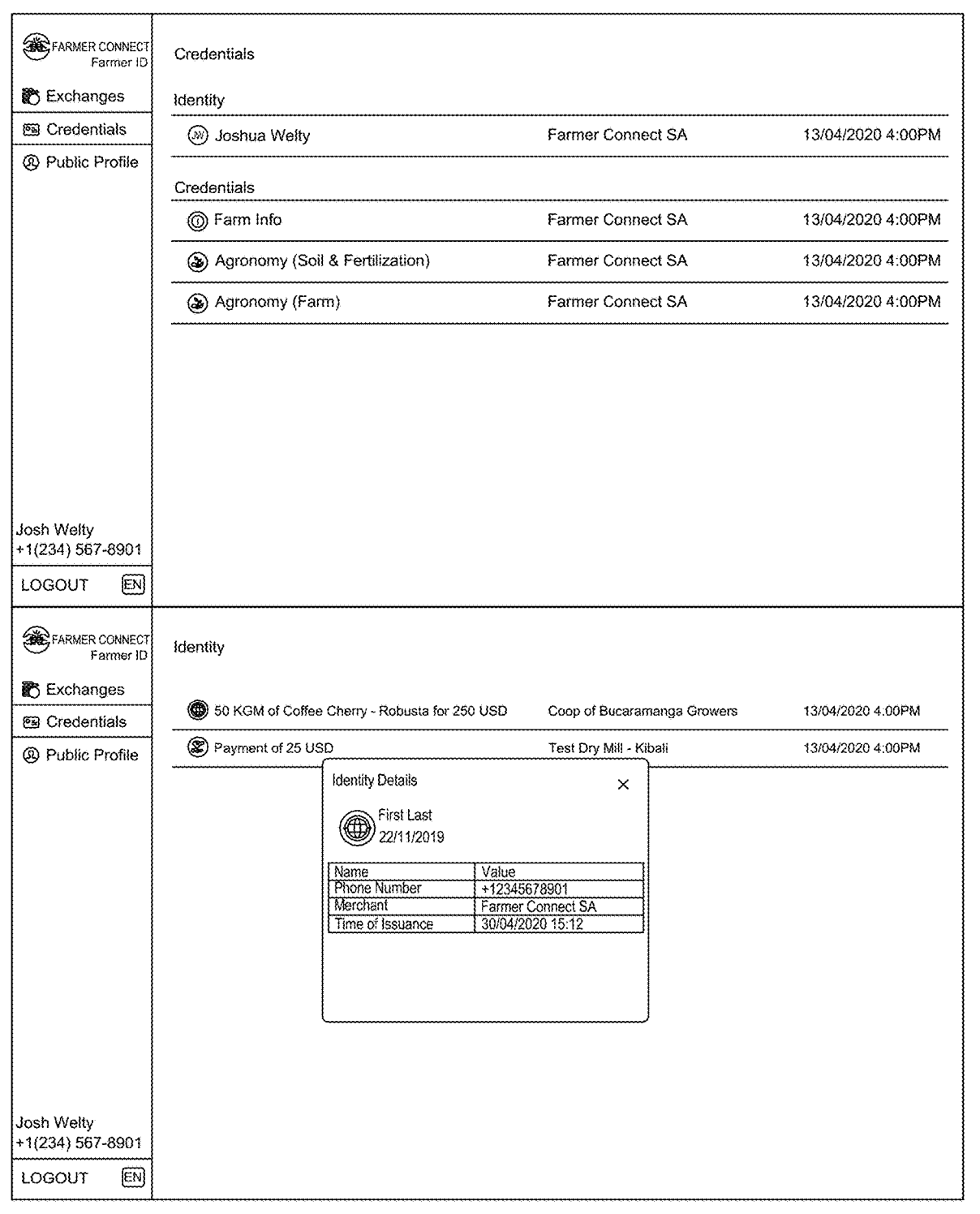
Figure 26:
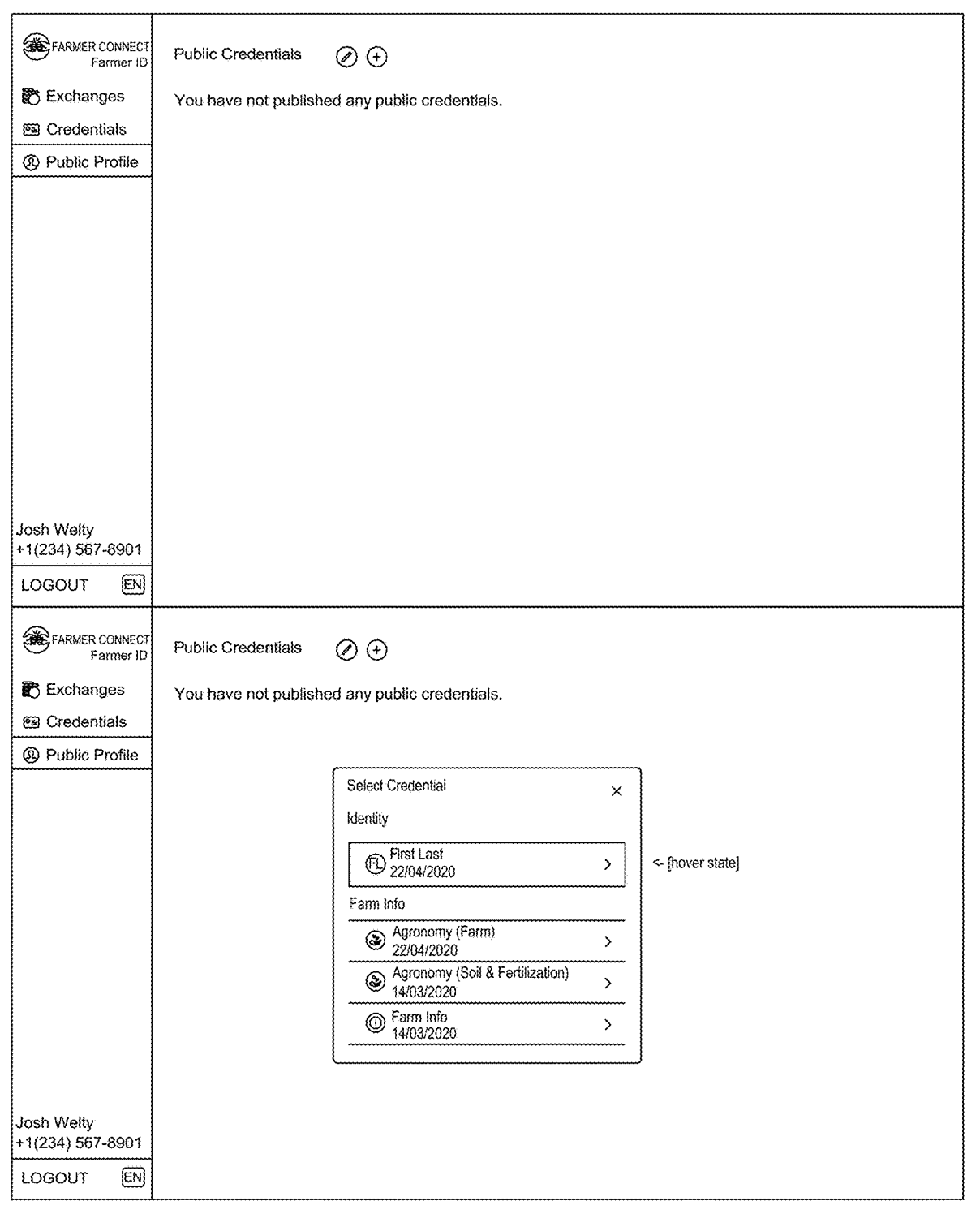
Figure 28:
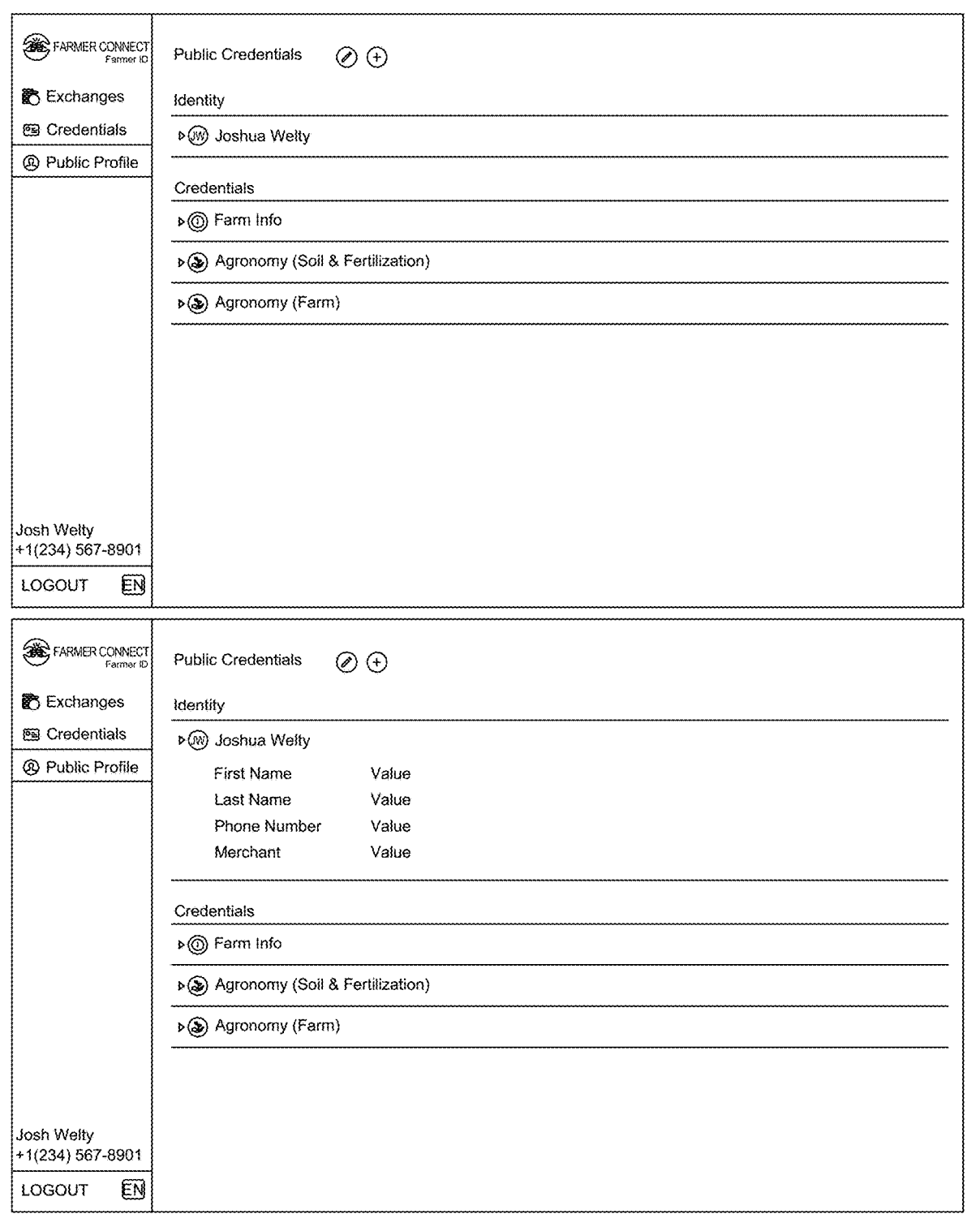

FIGS. 22-29 are screenshots of the Cloud Wallet application.

FIGS. 30-41 are screenshots of the Community Builder application.

DETAILED DESCRIPTION

Figure 1:
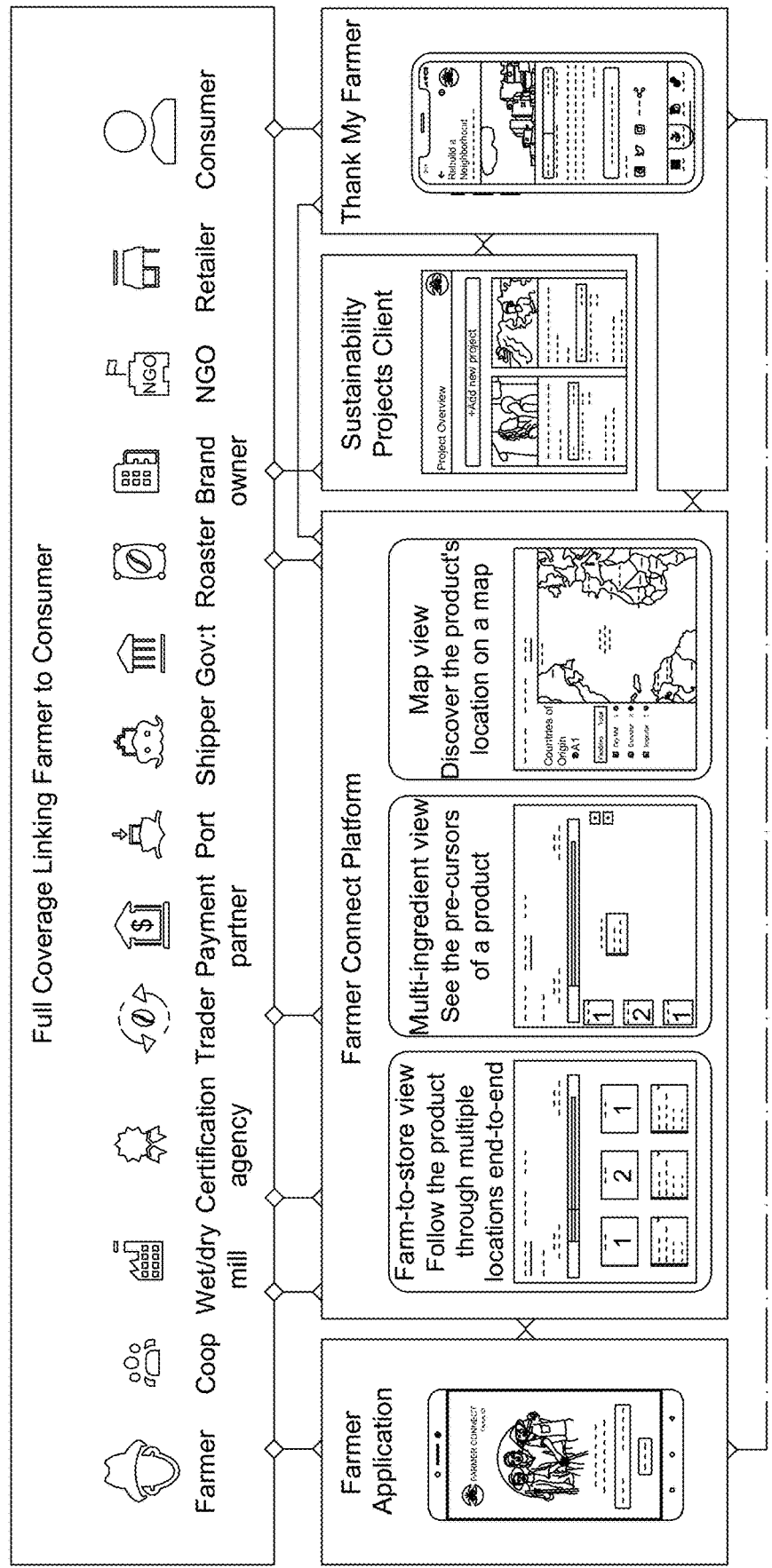
FIG. 1 is a schematic showing the overall Farmer Connect ecosystem.

Section A. Overview of the Farmer Connect™ System

This section will describe in detail the Farmer Connect system. The Farmer Connect system is a traceability platform built on blockchain and designed to help increase traceability, efficiency and fairness in agricultural supply chains, such as the coffee, cocoa, tea, sugar, grains and fruit supply chains. Farmer Connect links smallhold farmers to the global consumer. It is a blockchain enabled platform for global agricultural markets. In the Farmer Connect system, blockchain technology brings all the parties in the coffee supply chain together, simplifying the sharing and control of information and payments, and enabling greater trust. It creates an append-only digitized chain of transactions. Each network participant has a copy of the data, and additions to the blockchain are shared throughout the network based on each participant's level of permission. Farmer Connect includes a Self-sovereign Identity solution, a new form of digital identity using distributed ledger technology. This closes the loop on a circular economy that will enhance smallholder livelihoods while delivering transparency and a better experience for the consumer.

Farmers, wholesalers, traders and retailers can interact more efficiently using comprehensive, near real-time access to this data, and consumers can have new insights about the origins of the products they consume.

Consumers hoping to close the gap between their neighborhood barista and the farmer who grew their coffee now have a solution: Farmer Connect is introducing the "Thank My Farmer" app, a consumer-facing application that pulls information directly from the blockchain in a standardized way that can be used across the industry. It connects the user to farmers, traders, roasters and brands. The information is presented on an interactive map, allowing each product to tell a story in a simple and scalable way. The "Thank My Farmer" app also presents sustainability projects in coffee communities and an opportunity for consumers to support them. The "Thank My Farmer" app allows coffee drinkers to trace their coffee to understand its quality and origin, and even support the farmer who grew the beans. The aim is humanizing each coffee drinker's relationship with their daily cup: consumers now can play an active role in sustainability governance by supporting coffee farmers in developing nations. Through the blockchain and this consumer app, Farmer Connect provides a virtuous cycle. Users will be able to scan QR codes on various brands of premium single-origin coffee: coffee drinkers will be able to support the communities where their coffee beans are grown by funding local projects.

Farmer Connect solves fundamental real-world challenges that are common in numerous global agricultural markets of size.

Farmers: Farmers are increasingly separated from end-consumers, have no control over their data, and face strong global competition. The Farmer Connect Application will give them access to relevant information, control of their data, and help prove their creditworthiness so they can invest in their business. This will also create new revenue models.

Supply Chain: Trading smallholder commodities is paper and labour intensive, and it exposes companies to macro risks and legacy systems that make data homogenization, visualization and analysis a challenge. By bringing the industry together on a trusted impartial platform, supply chain visualization, efficiency, and marketplace modules will reduce costs and realign coffee prices with physical trade flows. And this will empower Farmer Connect customers with essential decision-making tools.

Brand Owners & Consumers: Consumers look to brands to provide new, safe, responsibly sourced products, and younger generations demand proof. Farmer Connect helps share the story behind the product, connects the brand to the retail consumer across all outlets, and allows the consumer to have a voice in supply chain sustainability. It will enable fast and targeted recalls, instant product differentiation, and visibility on shipments long before arrival for inventory management.

A schematic showing the overall Farmer Connect ecosystem is shown in FIG. 1 below.

We will now look at each element in more detail.

Farmer ID Application

Figure 2:
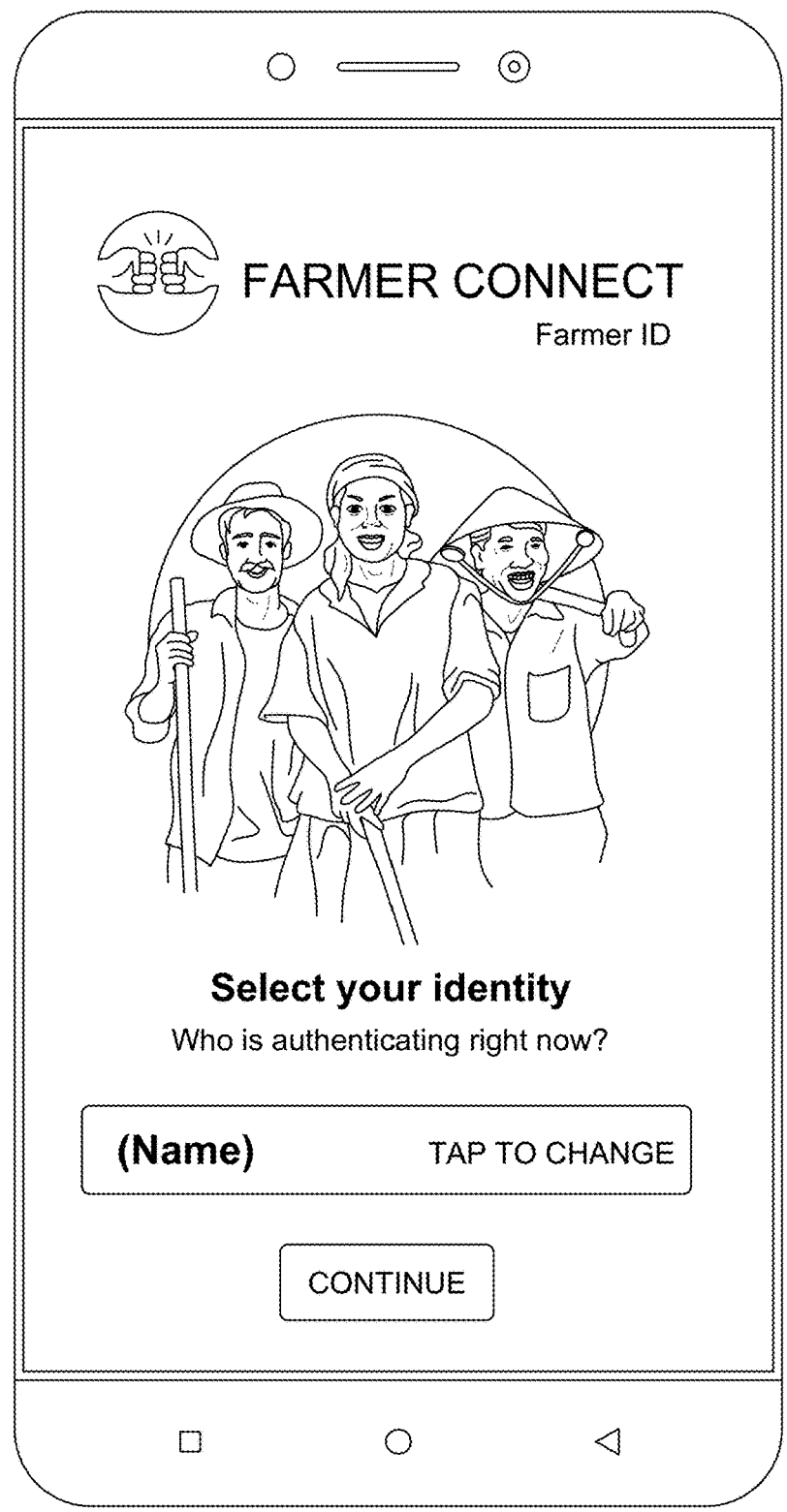
FIG. 2 shows the home screen for the Farmer application.

The Farmer ID application results in the Farmer owning and controlling their data for the first time. Behavioral and transaction certificates stored on a device or in the cloud. Transactions are pushed to the blockchain Proof of income makes farmers bankable. A combination of certificates makes a credit score or automatic KYC possible. The same principles can apply to business accounts or other users. A payment path to the farmer will be enabled in the short to medium term. FIG. 2 shows the home screen for the Farmer application.

Farmer Connect Platform

Data upload and retrieval is secure and permissioned on a document, and organization basis. APIs allow full integration with legacy systems to push or pull information. A dashboard using AI and analytics will give management insights on inventory, supply chain mapping, risk management, and outliers. Smart contracts and a full marketplace will radically reduce time and costs, especially at scale.

Thank My Farmer (Consumer App)

Figure 3:
FIG. 3 shows two screens from the Thank My Farmer app.

A link or QR code on coffee packaging takes the consumer to a standardized source of information, controlled by brand marketing, at the time they are most receptive to messaging. Integration with the blockchain means trace information updates automatically. Brand sustainability projects are automatically tied to all their products. GDPR-compliant user behavior analytics provided to the Farmer Connect client including aggregated baselines. FIG. 3 shows two screens from the Thank My Farmer app.

The Farmer Connect system enables responsible sourcing: Certifications have done groundbreaking work in raising consumer awareness and verification with "boots on the ground." There are however real problems: Reporting is done manually, usually on Excel, which is time consuming and can lead to errors.

Considering multiple-certification per farm, there is not enough supply to meet demand. Some farmers bear the cost of certification while having to sell their coffee uncertified. The selection of farmers who benefit from certification can be arbitrary and lead to inequality. Uncertified sustainable behavior is not always rewarded. Rigid administrative requirement can lead to malpractice or incentivize cutting corners.

In the Farmer Connect system, farmer-related data is controlled by Farmers: farmer and consumer data have a value to many traders, brand owners and NGOs. Many groups would like to offer services to farmers and increase consumer sales. Farmer Connect is positioned to broker data flows in both directions.

Today the majority of agriculture products are traded analog or semi-digital (phone, email, chat) and are hedged on an exchange (ICE, CBOT, BMF, etc.). Farmer Connect provides an exchange for blockchain enabled agriculture products that include smart contracting, traceability, responsible sourcing metrics, logistics and inventory.

Building an ecosystem on Farmer Connect will allow other entrepreneurs to build additional "layers" and services, like tracking payments on blockchain, on top of the platform. Billions of dollars are spent on development and aid each year yet there is little clarity how much actually arrives at its intended recipient; Farmer Connect can provide an alternative, fast, trusted and transparent mechanism for flowing money directly to the smallhold farmers who are the foundation of these agricultural systems.

Figure 4:
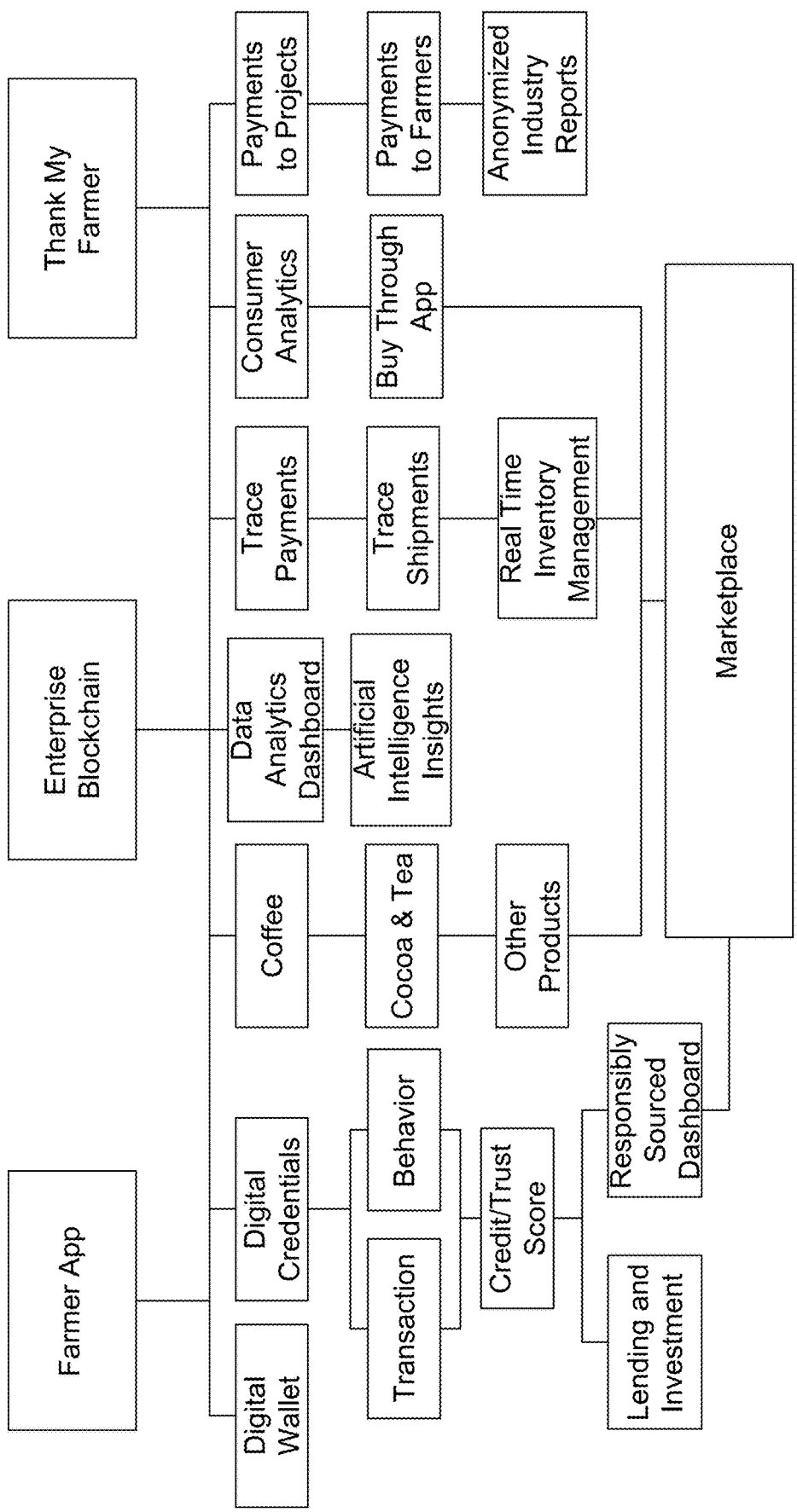
FIG. 4 shows the overall technology architecture.

The overall technology architecture is shown in FIG. 4 below.

Figure 5:
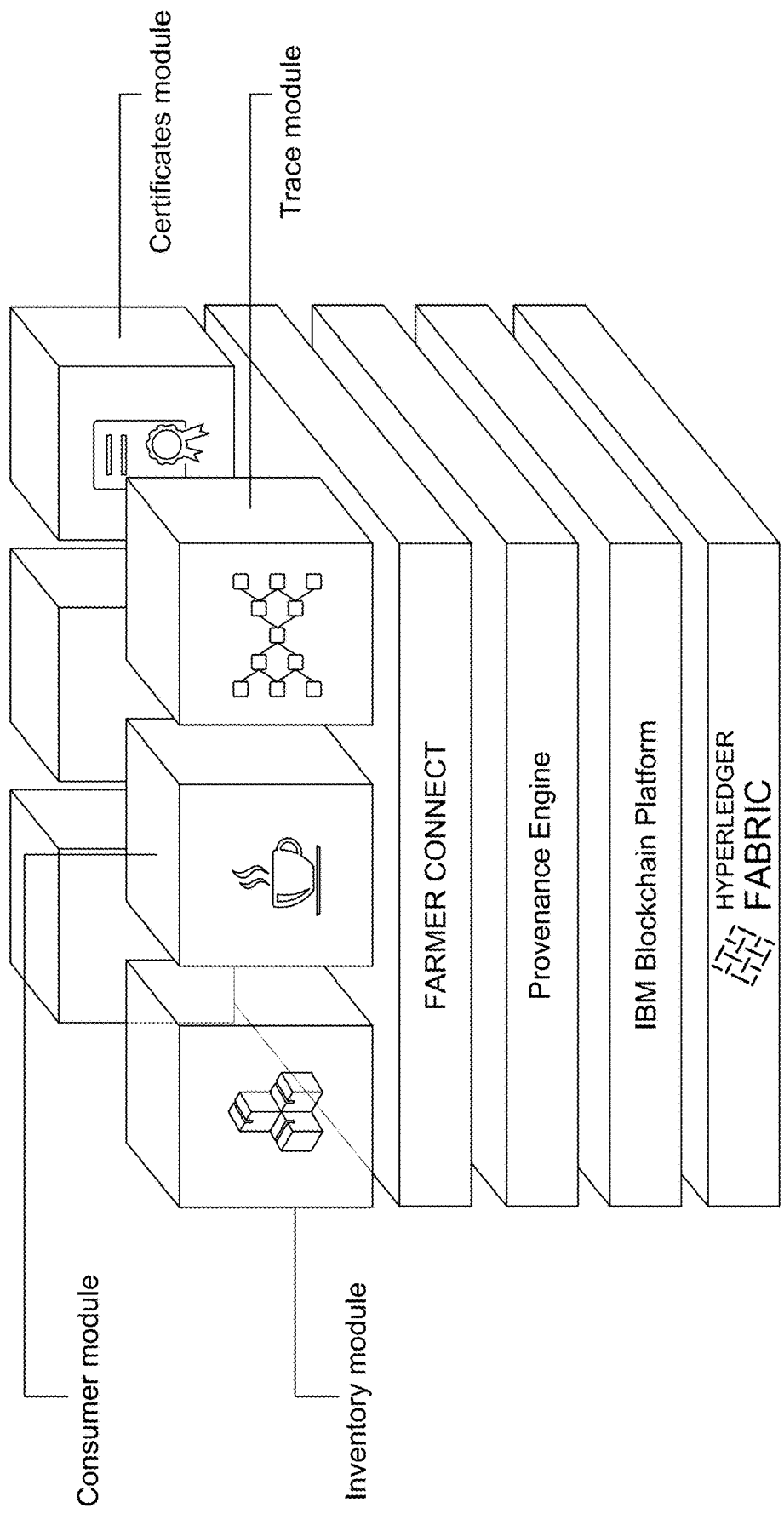
FIG. 5 is a schematic showing the general modular structure, building on Enterprise Blockchain.

Section B. Pushing/Pulling Data to Enterprise Blockchain & Module Application Build-Out In this section, we look at how the Farmer Connect system builds on Enterprise Blockchain A schematic showing the general modular structure is shown in FIG. 5 below.

Pulling Data from the Enterprise Blockchain

Farmer Connect has developed the Consumer Module, which pulls information directly from the blockchain into the consumer application. The app, named "Thank My Farmer" presents to the consumer the description of the product they are enjoying plus provides an interactive map showing the journey the product has taken. Lastly, the product is linked to sustainability projects being implemented by the brand owner or are in closest geographical proximity to the consumer's selection. The consumers are then empowered to learn, support, track payment info and measure impact of those projects.

Pushing Data to the Enterprise Blockchain

With the creation of the Farmer Application, utilizing a Self-Sovereign Identity solution for Farm(er)s, there will also be the creation of a digital transactional credential. This credential will be used to capture the price, quantity and possibly the quality of the product (e.g. coffee beans) being sold by farmers and bought by processors and traders. The farmer will receive the digital credential and will also confirm that the terms and conditions are correct.

The confirmation by the farmer of the transactional credential will be stored on their Farmer App but will also likely be pushed on to the buyers Enterprise blockchain account to form the first block of the traceability and transparency data capture.

By combining the farmer data capture that is the beginning of the blockchain trace and carrying it all the way to the consumer application, Farmer Connect is truly providing an end-to-end data capture. However, that data can flow both ways so it is also possible to take points of sales of products and transfer that data back to farmers so they can see where their product is being sold.

Using Blockchain to Facilitate Direct Payments to Farmers

Once a SKU is connected back to farmers using the application/digital ID solution provided by Farmer Connect and connected to a digital wallet or bank account, it makes it possible for consumers or brand owners to make payments directly to growers. The payment would be digitally verified by a transactional credential similar to the initial credential received upon payment of the goods. This allows for both the payment and receipt of payment to be captured on blockchain, with a unique key ID that ensures both parties of the validity of the transaction.

Building Credit/Trust Scores Through Digital Identity and Credentials

Farmer Connect includes a Farmer Application that embeds a Self-Sovereign Identity solution built on top of Hyperledger Indy/Aries. For the first time in history, it is envisioned that farmers begin to control their personal data and can permission it to be shared with trading partners, banks, NGOs and others offering them services.

Farmer ID gives the means to store both transactional and behavioral information.

Transactional Credentials:

1. Farmers who sell their agriculture products to a Farmer Connect ecosystem member (authorizer/validator role) will receive a digital credential of the transaction (verified by each party) that shows the volume, price and possibly the quality of the product being sold. This is not limited to a mono-commodity but can be verified across multiple commodities (coffee, banana, corn, etc.).

2. Farmers who have other employment—such as picking coffee, provided by Farmer Connect ecosystem partners activities—will be able to receive and confirm a digital credential of the amount paid for their services.

The combination of products and services sold are intended to capture the total income of farmers (but is not limited to just farmers).

Behavioral Credentials:

1. Farmers will be able to add non-verified data to their identity, such as cost of production, farm location and size, cooperative association, social standards, environmental work, certifications currently valid or expired, training classes completed, awards won, etc.

2. Additionally, any third-party group that is part of the Farmer Connect ecosystem (authorizer or validator role) will be able to issue a digital credential verifying a claim made by the farmer or adding new information under the Farm(er) Identity. Examples of this might be Rainforest Alliance/UTZ certification, NGO completion of Good Agriculture Practices training class, a certificate for environmental stewardship from a trade house or an award won by the local cooperative.

Transactional Credentials can be combined with Behavioral Credentials to create a customized trust/credit rating for farmers. Each party creating a rating will be able to preview who are the verifying parties (credential issuers) and place a weighting on that group. So for example, a well-established, reputable NGO would likely hold a higher weighted score than an individual coffee buyer.

It is then envisioned that the Farmer Connect Rating (or independent third party) will be used by banks, entrepreneurs and NGOs to provide services to Farmers (again, not limited just to farmers) in a way that manages their risk accordingly. It is also believed that large brands and retailers who want to prove their sourcing of "responsible" coffee would be able to use the Farmer Connect platform to trace the final SKU all the way to the farmers with a certain rating threshold that could be developed for them by themselves, Farmer Connect or a neutral third party.

Figure 6:
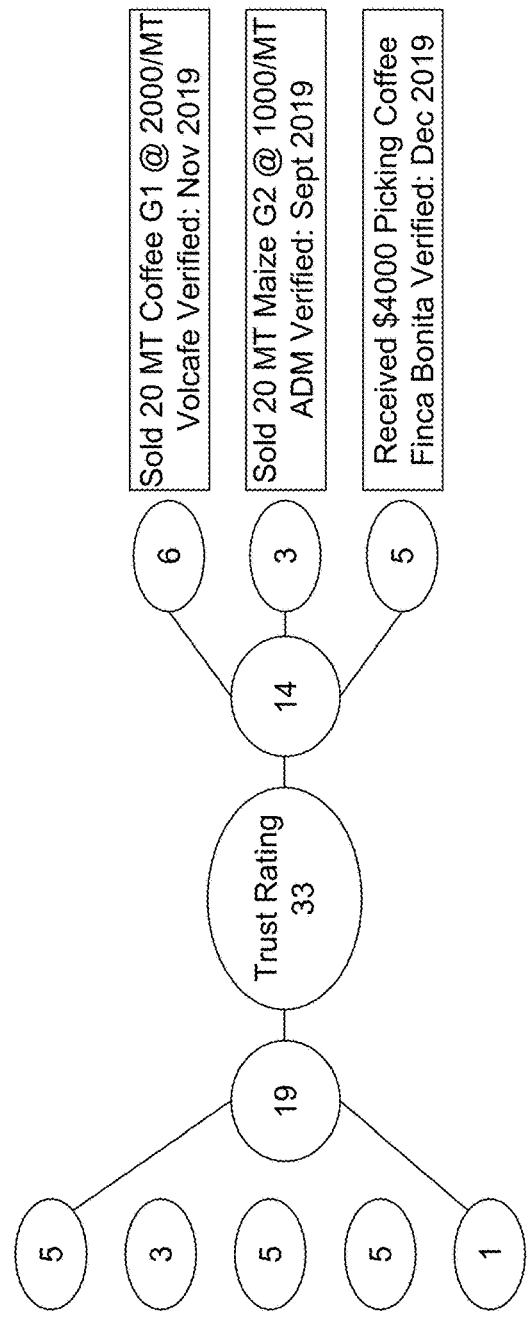
FIG. 6 is an example diagram of how a credit rating would work.

FIG. 6 below is an example diagram of how the credit rating would work.

Section C: Technology Architecture

Figure 7A:
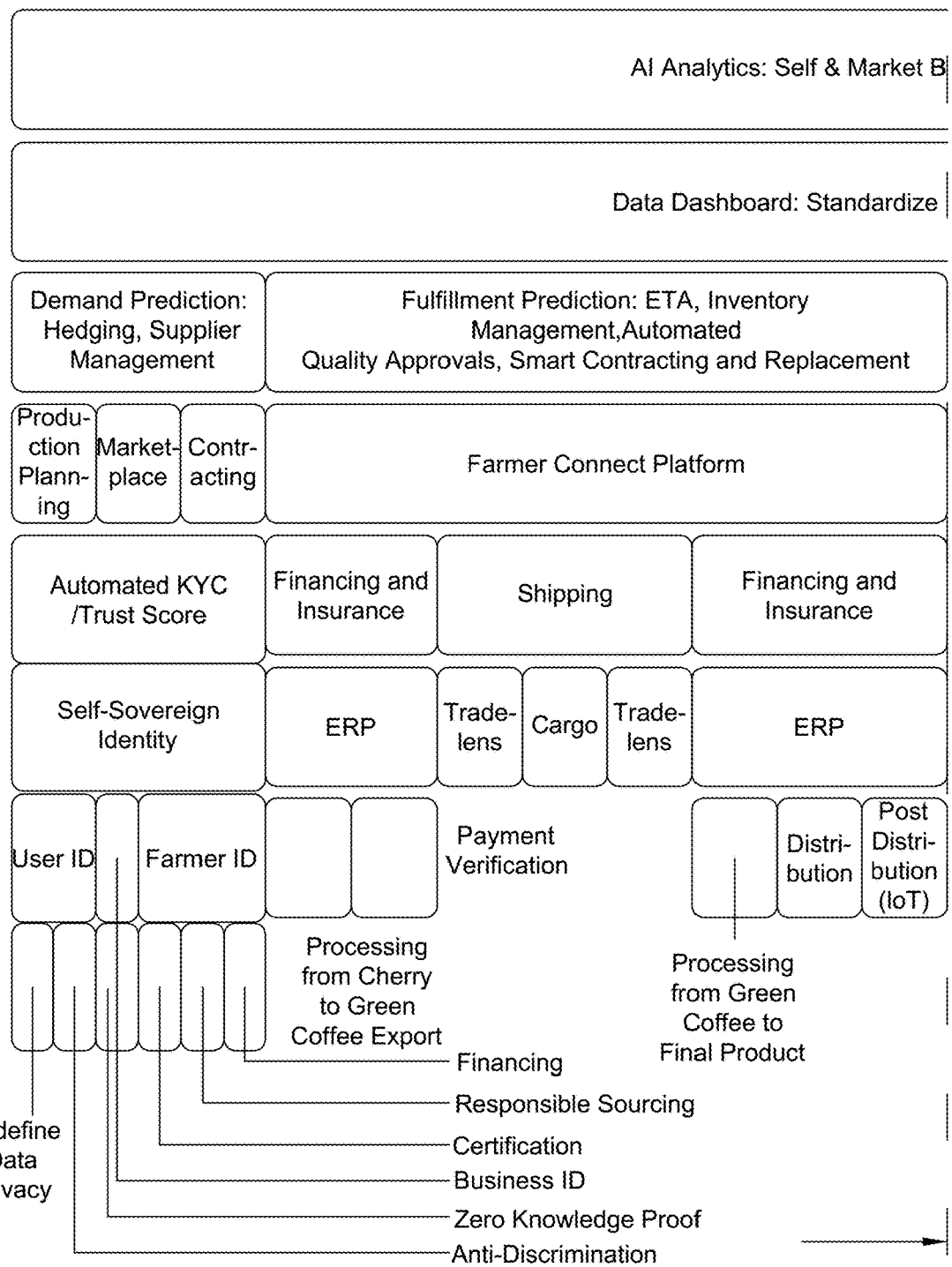
FIGS. 7A and 7B show the overall architecture of the Farmer Connect system and related systems.
Figure 7B:
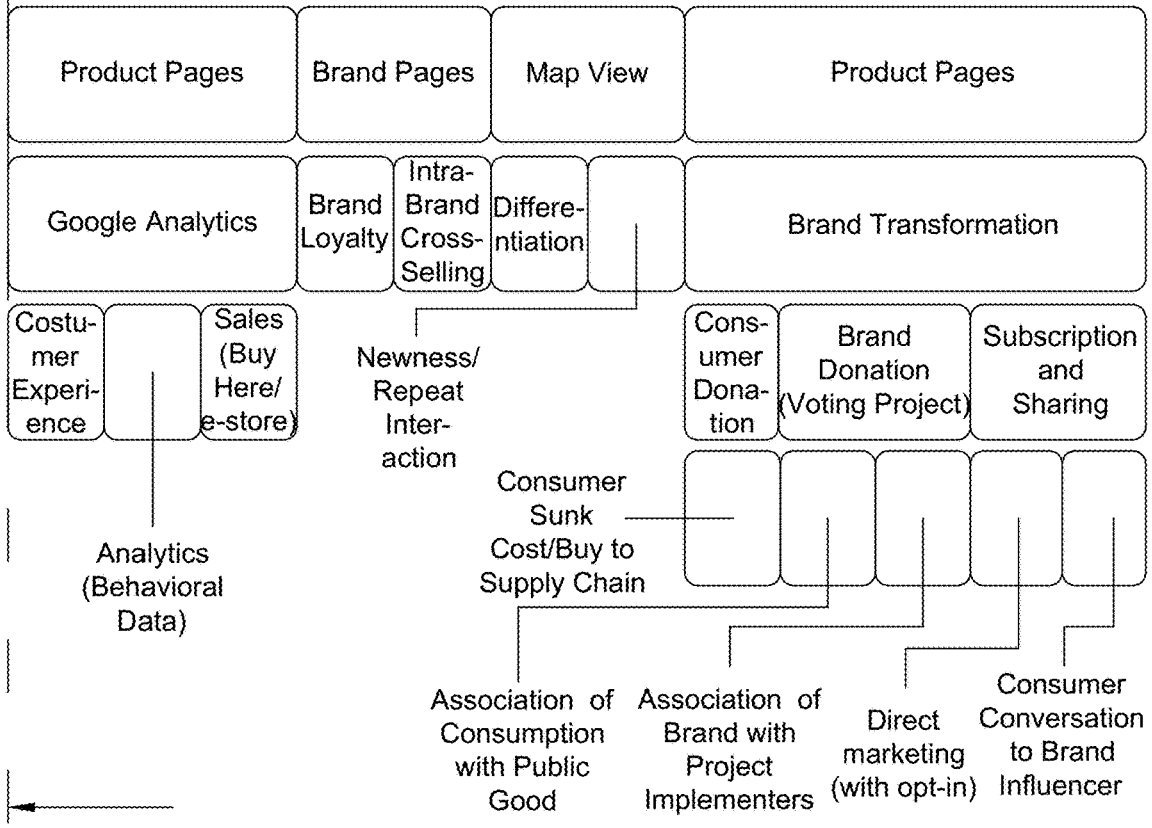

The overall architecture of the Farmer Connect system and related systems is shown in the FIG. 7 below.

We can break this down into its six main components.

1. Supply Chain Management: the Farmer Connect Platform

Traceable coffee is not impossible, but it is a lot of work. The Farmer Connect Platform is not designed to replace Enterprise Resource Planning software (narrow and deep) but to convey information between people and systems (wide and shallow). Farmer Connect enables each participant, from the farmer and the collector by the side of the road to the Internet of Things connected brewer, to add their information to the trace. Buyers contract coffee+data from their suppliers. Trace participants (if permissioned) see uploaded data in real time. There is no need to send emails or call. For large/sophisticated participants, the data can flow directly into and out of their ERP.

Participants can choose to anonymize and share certain data with the platform (like transit times). Centralized data allows sharing, performance analysis, and predictive analysis. It's the foundation of all the other modules.

Practical Applications:

Using a scanner, a digital fingerprint of a Pre-Shipment Sample and an Arrival sample are uploaded and compared. If the results are within X %, the Arrival is automatically approved, giving staff more time to analyze divergent results. A packer uses three different information systems in their three packing plants, and their clients/suppliers use their own systems. Rather than pay and train users to switch to a single system, each system pushes and pulls information to/from the Farmer Connect Platform.

Transit time benchmarking indicates the minimum time from milling in Colombia to arrival to North America is 40 days. At 39 days, the roaster requires the trader to cover afloat. At 10 days, the roaster requires the trader to cover spot. A retailer is required to conduct a test recall. They enter the lot number of the product and trace it in less than a minute.

Figure 8:
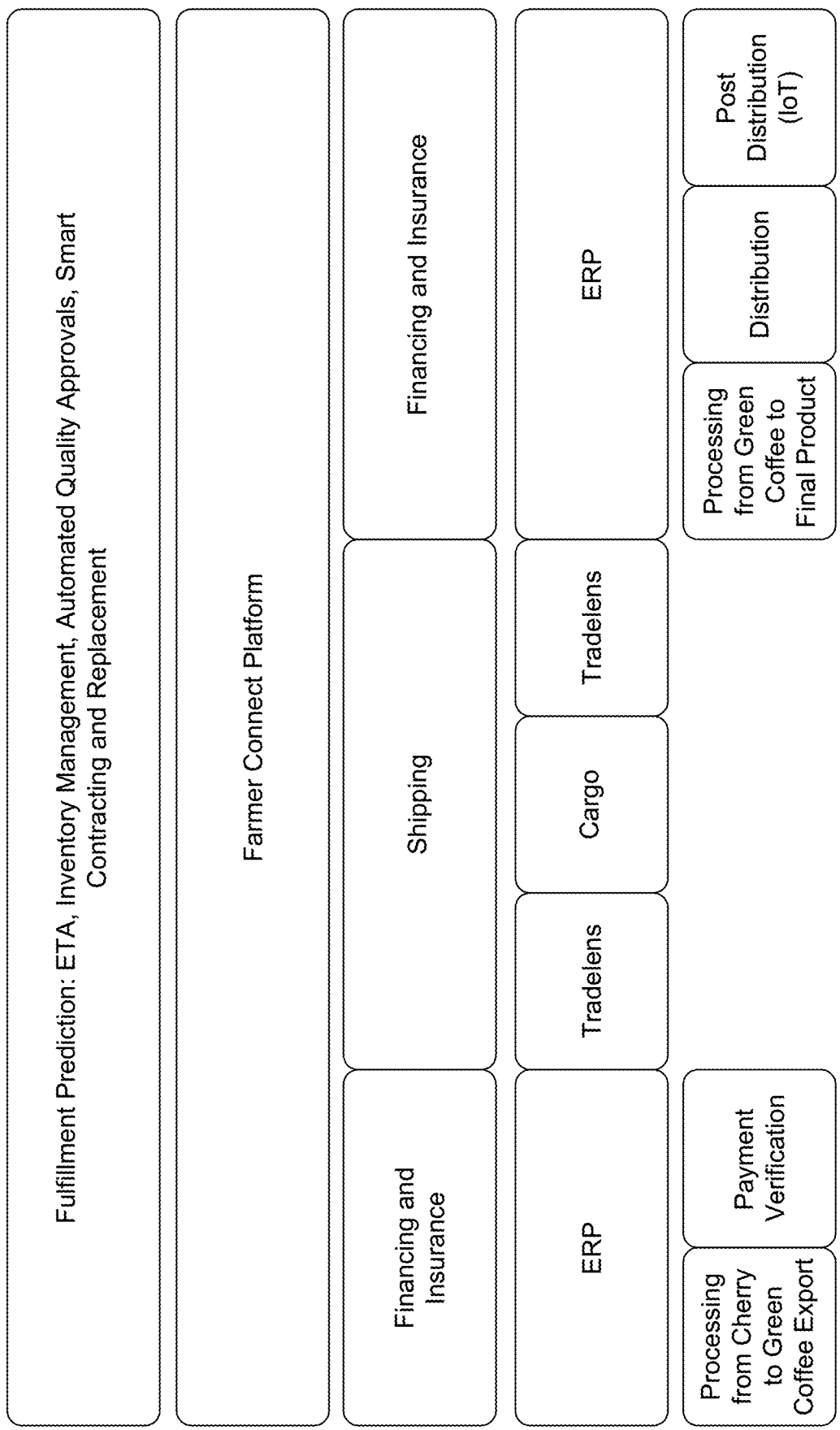
FIG. 8 is an enlarged view of the relevant core functional elements.

An enlarged view of the relevant core functional elements is shown in FIG. 8.

2. Digital Identity

A Decentralized Identifier (DID) is a new type of identifier, allowing the controller to prove control over it without any additional intermediaries, centralized instances or certificate authorities. This is a key enabler for the implementation of the concept of Self-Sovereign Identity (SSI), where the individual regains full ownership and control over their digital identity.

Figure 9:
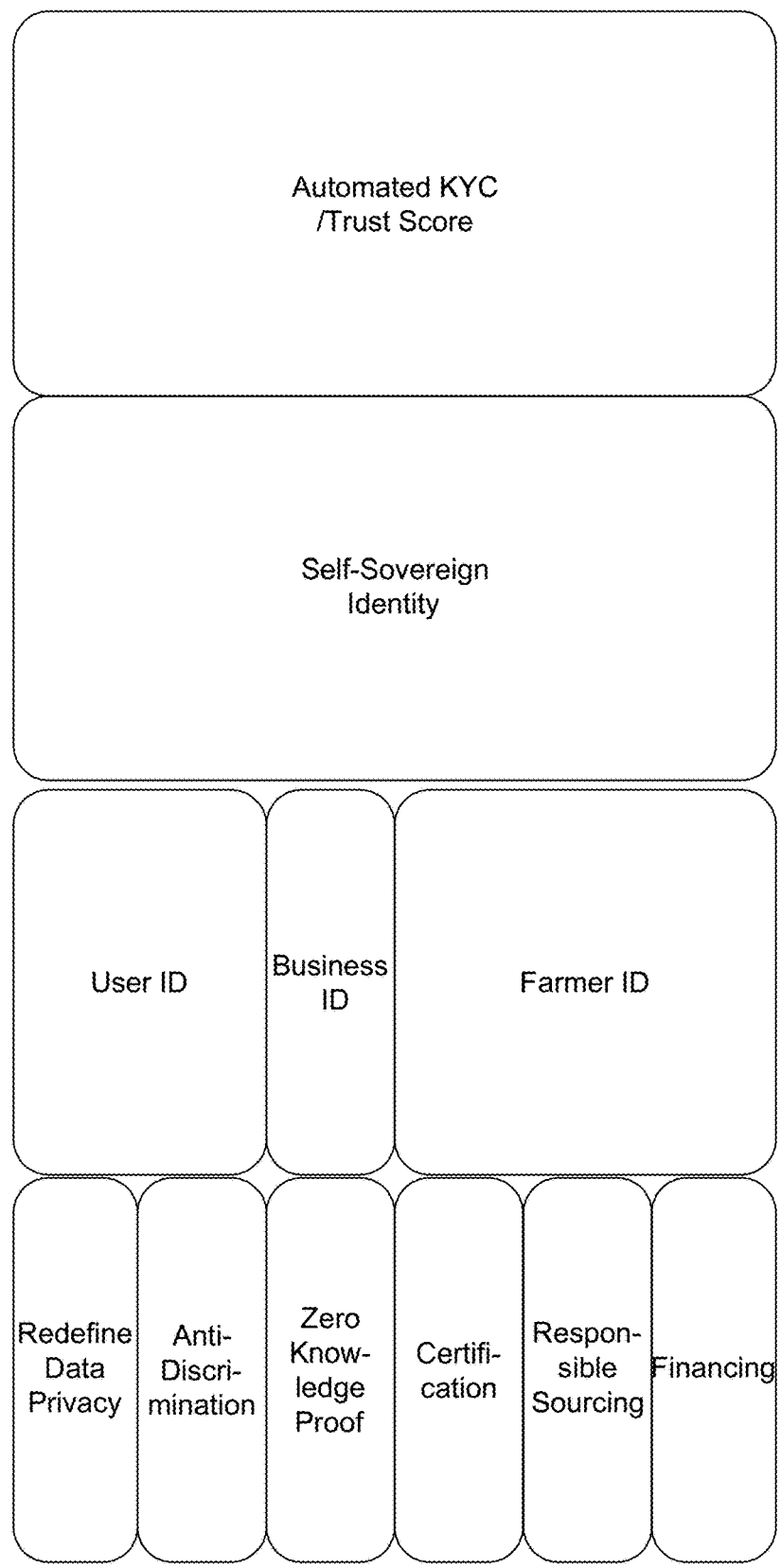
FIG. 9 is a schematic showing the Self-Sovereign Identity (SSI) system.

Part of the SSI concept are Verifiable Credentials (VCs), issued by one or more participants of a network to a user. They can describe behaviors, assets, or transactions among other things and carry the digital signature of the issuer. Credentials from trusted parties, agglomerated into "trust scores," can form the basis of trustless interactions (where you don't need to "know" the counterparty) and zero-knowledge proofs (where a program analyzed data and returns a score or yes/no without exposing the information). If we can do it for the farmer, we can do it for businesses and private individuals everywhere. Of all the components, SSI has the greatest potential for disruption inside and outside of agricultural commodities. See FIG. 9.

Practical applications:
- An agent at a collection point buys coffee cherries from a farmer on behalf of an exporter. Farmer ID logs the quantity and price paid to the farmer's wallet and the exporter's blockchain.
- A farmer requests a loan based on their transaction history (proof of income).
- An investor or bank loans money directly to a group of 10,000 farmers based on a list of criteria.
- A trader KYCs a new client without looking at their balance sheet (the algorithm builds key numbers into a trust score).
- A roaster holds a blind auction to buy green coffee from suppliers who meet trust and operational score requirements.
- An exporter who meets sustainable score requirements receives trade finance at a lower interest rate.
- A user receives income for the use of their data in targeted marketing. Their information is stored on a USB key, not a social media company's servers, and they can block access whenever they choose to.

3. The Marketplace

The ICE exchange is worth $50B. Most of that value has been created on the back of transaction fees.

If the seller and buyer of an ICE certified coffee are both on Farmer Connect, there's no reason that coffee cannot become traceable.

Figure 10:
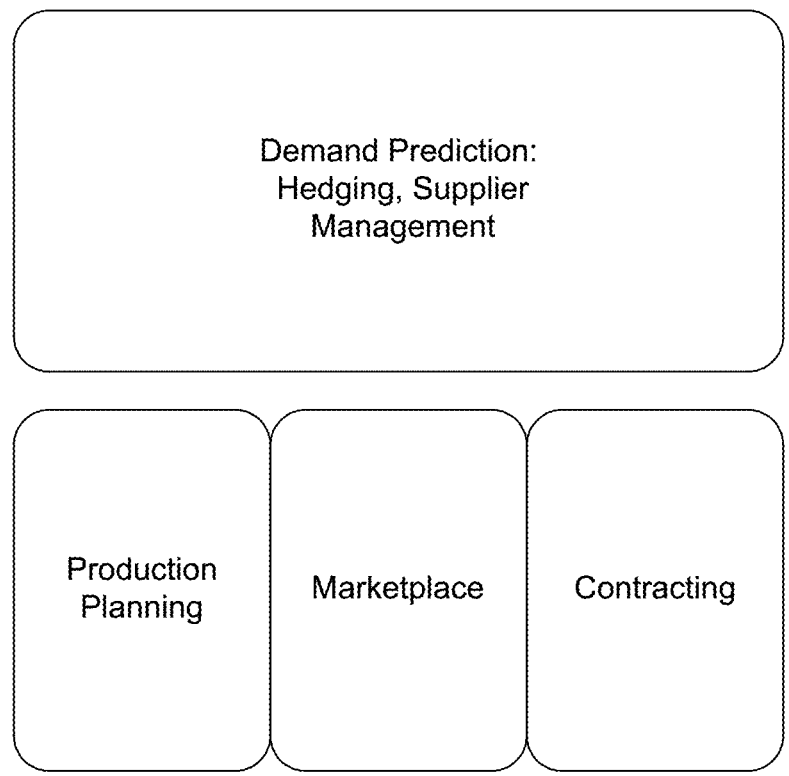
FIG. 10 shows the marketplace system.

With wide adoption by a commodity's industry and the shift toward flat price buying direct from the producer, Farmer Connect could fill a niche in providing access to traceable coffee, tied into companies' production planning software, with counterparty risk management enabled through the Self-Sovereign Identity solution (SSI), and contract terms immutably stored on the blockchain and resolved through smart contracting. See FIG. 10.

4. Consumer Intimacy: Thank My Farmer Application

The combination of blockchain and consumer application acts on several levels of persuasion:

Scarcity: by being more specific, the uniqueness and perceived value of each product, and each batch, is increased.

Social proof: through project donations and statistics, the consumer is given indications of participation by their peers.

Consistency: consumers who contribute to brand/product projects are more likely to do so again and to stay loyal to the brand for non-financial reasons.

Liking: the brand communicates their good deeds in a setting where the consumer is searching for that information and is associated with other goodwill brands. Further, people like things that are similar to them, and by tailoring their communication to the consumer base, a brand becomes more likeable.

Authority: as a source of decentralized information from the entire supply chain, Thank My Farmer becomes a credible source of information (including the marketing placed on product and brand pages by the brands), like Wikipedia.

Reciprocity: by providing information, the brand encourages the consumer to provide information in return.

Figure 11:
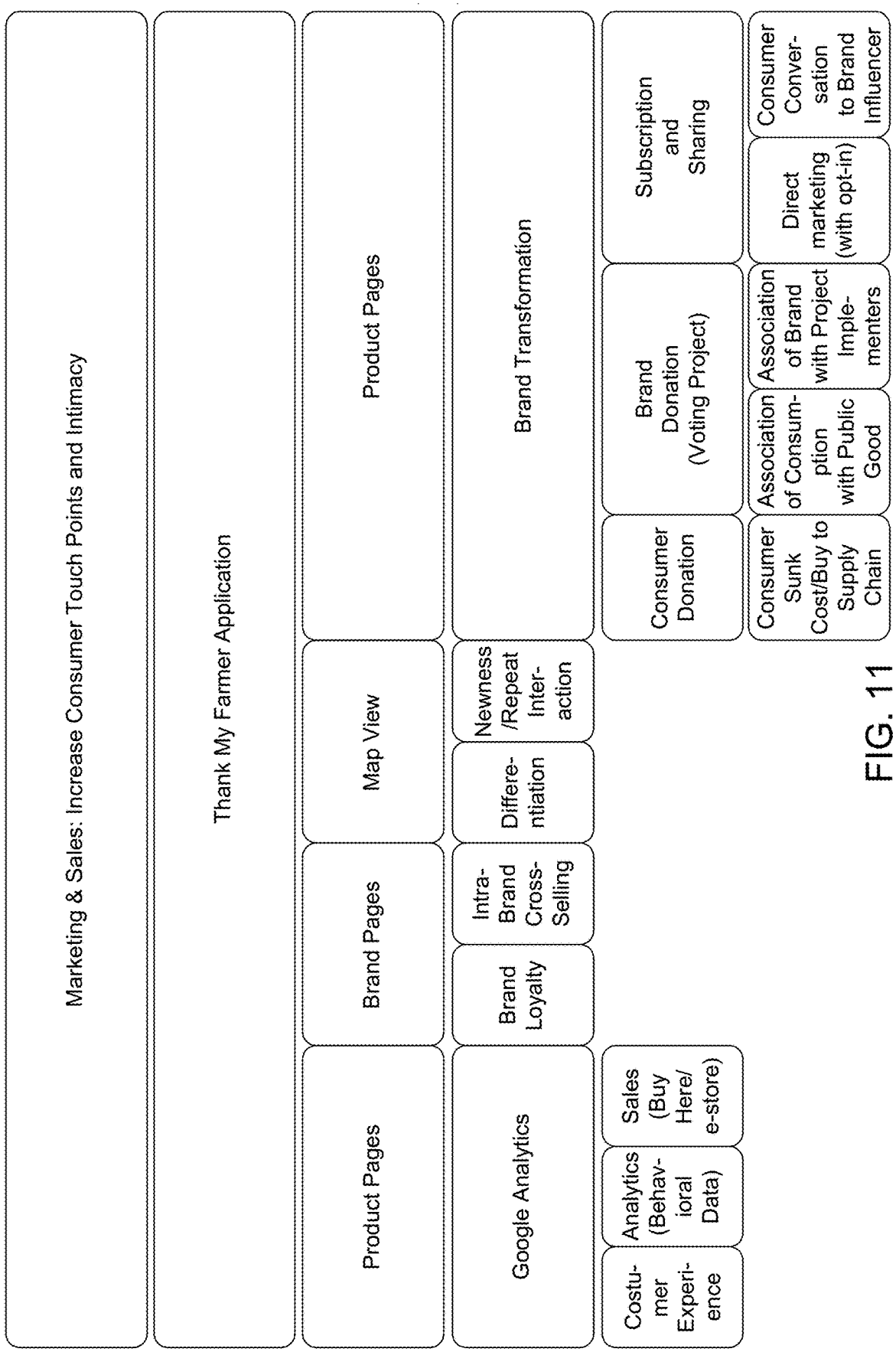
FIG. 11 is a schematic for the Thank My Farmer application.

Combining SSI with Thank My Farmer, consumer profiles can be stored with perfect regard for privacy allowing for purchase histories, product recommendations, and direct marketing "on the consumer's terms", making them receptive, while at the same time maximizing the collection of anonymized behavioral data to drive communications' and marketing strategy. See FIG. 11.

5. Data Dashboard

Figure 12:
FIG. 12 is a schematic for the data dashboard.

Farmer Connect is not just a blockchain initiative. There is a role for blockchain, but without scale, integration, and analytics, blockchain does more harm than good. The "dashboard" will bring together data from ANY blockchain (such as Komgo™, Covantis/ABCD™, others), other data services (such as Cargoo™, Tradelens™, Libra™,) to allow further combinations and analysis of data. In addition, the development of a flexible data dashboard will mean Farmer Connect is not dependent on any one system. The data dashboard will enable, as a minimum, advances in demand prediction, hedging, contracting, estimated times of arrival, inventory management, quality approvals, smart contracting, and replacements. See FIG. 12.

6. AI

Figure 13:
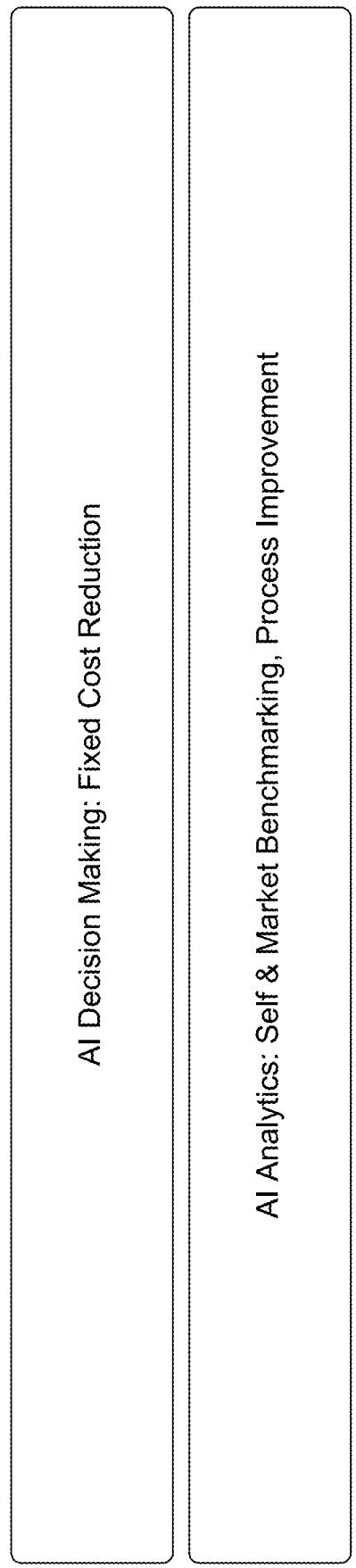
FIG. 13 is a schematic for the AI.

Once the organization's own data and benchmarking data from the industry is brought together, the next step will be automating the analysis of that data. As a first step, we will use machine learning to identify and draw user attention to outliers—production facilities with lower than average yields, warehouses and ports with higher than average weight loss, routes with higher than average transit times. As the availability of cleaned and tagged data increases, as well as records of the decisions taken by supply chain actors, AI driven decision making will be enabled: automated requests for information, data driven procurement, and automated responses to queries. Bottom line is that one person backed by a properly trained AI will be able to accomplish more over a greater area with less expertise. See FIG. 13.

A Possible Future

Figure 14:
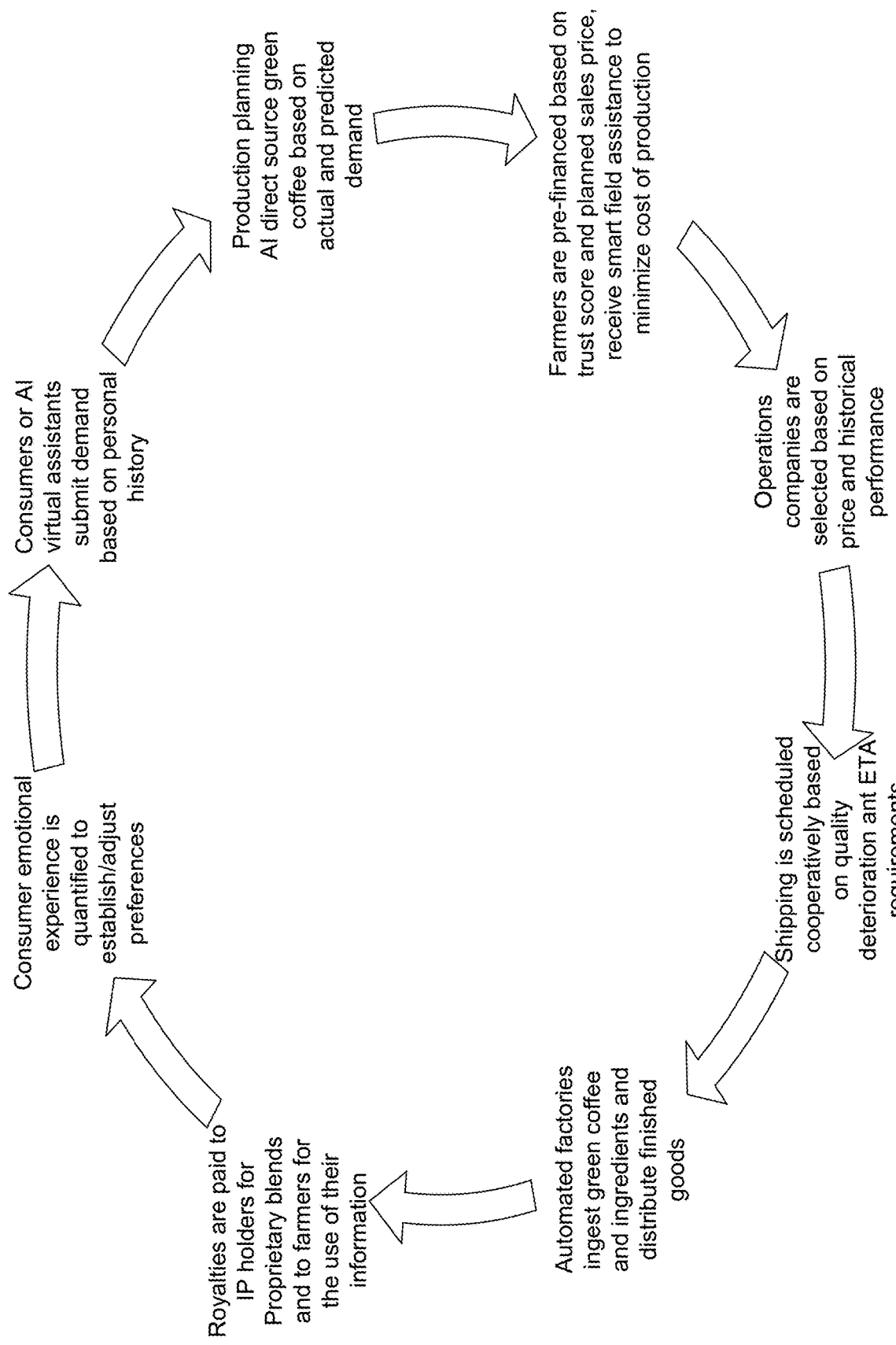
FIG. 14 shows a possible future scenario.
Figure 15:
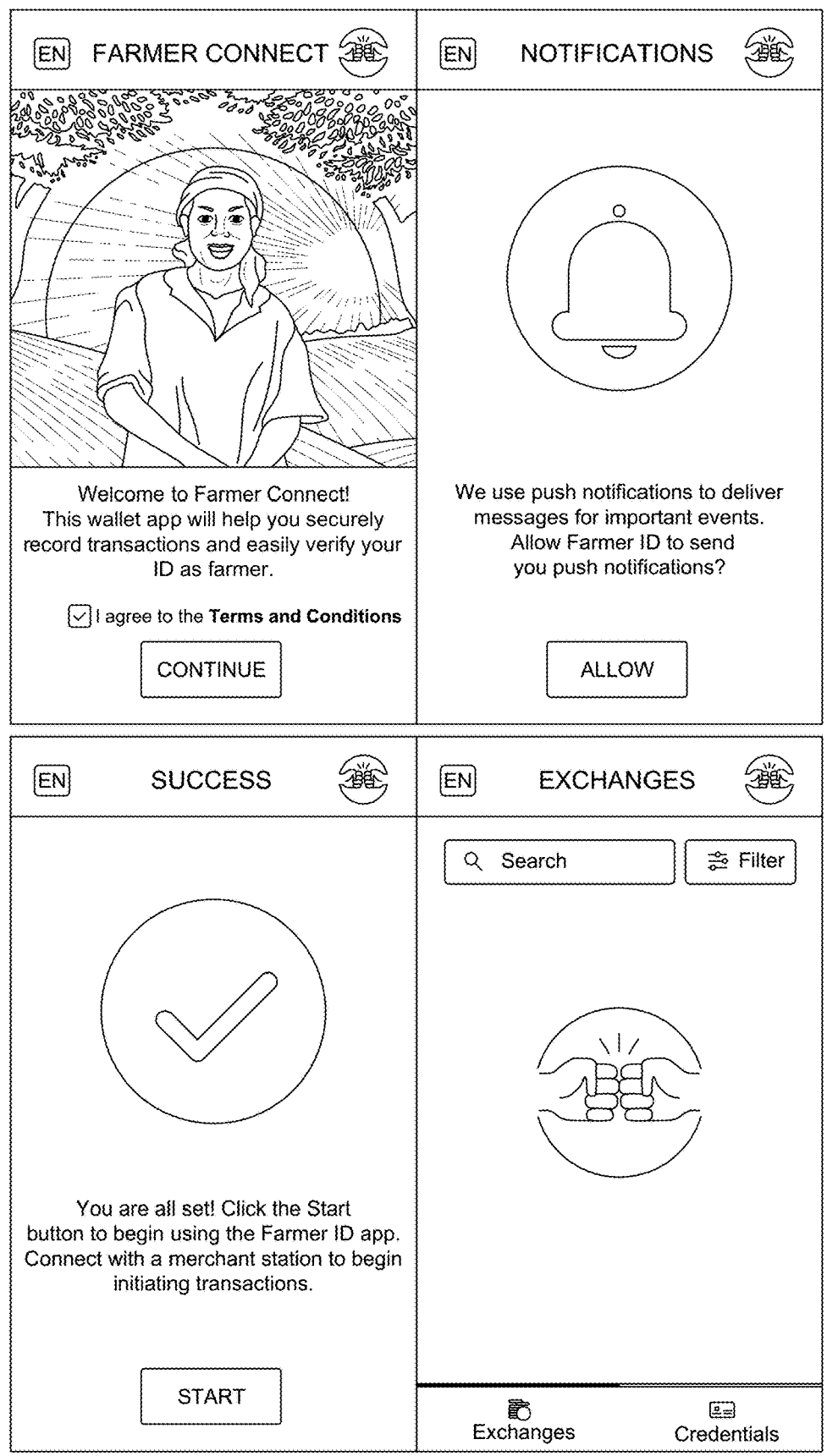
Figure 17:
Figure 18:
Figure 22:
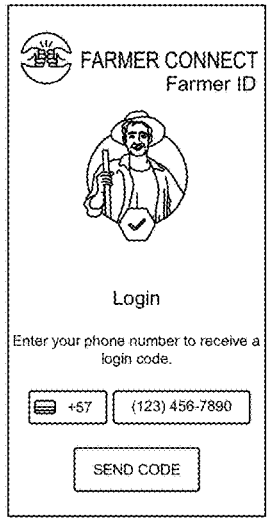
Figure 24:
Figure 27:
Figure 30:
Figure 34:
Figure 41:

FIG. 14 shows a possible future scenario.

Starting with the Consumer emotional experience, we use a "Consumer ID" to log a consumers preferences. It's a question of taking the inferred information (like social media gathers) and the deliberate information (like a user saying he or she likes traveling) and combining them in a profile that is both secure and under the consumer's control. On top of that, the entire buying history of a person for X years, potentially their whole life.

That Consumer ID feeds into an algorithm, virtual assistant, or artificial intelligence that creates a "demand" profile for that consumer based on what they are expected to consume in the future. It's 80% what they always eat, drink, wear, etc, but it's also (based on their tolerance/desire for change) some new products that are similar but different enough to provide novelty. That information is fed and consolidated into the demand planning software of manufacturers local (or at least, local enough) to that pool of consumers.

Using Business ID to determine whether suppliers fit the reliability, quality, and environmental/social/governance requirements of the production plan, raw materials are contracted from as far upstream as possible. Producers use these contracts, sometimes booked 6, 12, 24+ months ahead, to get financing to better run their farms, receive smart-field subscriptions which use less fertilizer, pesticides, and water, and other assistance to increase yields and profitability while reducing costs and environmental impact. Independent agronomists are empowered to provide both audits (and issue credentials) as well as receive commissions based on volumes sourced, loans issued, fertilizer sold, etc. Every time a middle man goes to pick up produce, they go out with a truck full of things those farmers need (as determined by Farmer ID).

The marketplace creates a kind of running balance based on the true supply and demand of goods, adjusting prices up with demand is strong, recommending alternate products, and pushing prices back down when the supply increases. Production should be planned out 2 years or more ahead of time with frequent updates from farmers/miners/agronomists/auditors, and the actual booking of contracts would happen at the instigation of the manufacturers' algorithmic or human driven decisions, locking prices in and giving producers income security.

The manufacturers also use the marketplace to procure other services from people who currently have the role of logistics companies or traders. These include mitigating weather, market, counterparty, and other operational risks, and delivering the goods at the right place and on time. We would incentivize traders to focus on the areas that make them money (speculation and risk management) and leave the production and sourcing to the people it matters most to (farmers and manufacturers). Past performance records in Business ID would reward top performers (like people who always deliver on time) by allowing them to be ranked equally to less expensive companies with worse records during the auction process. As a longer record of business is inherently more trustworthy, we see this ending the practice of folding a shell company and reopening a new one to escape financial obligations, but rather that it would be valuable to buy an established company and fix its problems to acquire its digital track record.

As all these shipments would be on the same system, integrated with systems like freight booking software and shipping lines' planning, we could enable operations such as delaying a shipment of metal in favour of a more perishable good in exchange for a value sharing based on the loss of quality incurred by being stuck at port.

Upon arrival at the factories, which are owned by professional manufacturers and run with a maximum of automation, the raw materials are processed based on the quality specifications of the consumer or specialized recipes that have been developed by brands. These recipes are kept secure through the same encryption and permissioning that enables both our blockchain and Business ID solutions, and the brands receive royalties for that production based on usage. This means that brands are truly focused on marketing, consumer interaction, and R&D to develop the most competitive recipes.

The product is then distributed to the consumers, starting a new feedback cycle where the consumer rates their enjoyment of the goods they have received which creates a new or adjusted demand.

Appendix 1

In this Appendix 1, we give a more detailed description of the Farmer Connect product.

Product Summary

Farmer ID helps farmers manage payment receipts and farm digital documents (e.g. licenses) that are sent to them from the merchants that they do business with. Farmer ID also helps merchants create, issue, and manage credentials they send to farmers.

A Wallet for Farmers

Farmers currently manage these documents (payment receipts, farm documents, other credentials) with paper credentials that are hard to organize and verify. Farmer ID gives farmers a digital wallet that can receive and store these credentials securely for them. Farmers can use their digital wallet to prove the validity of these document to others. If a farmer has a smart phone, they can download a mobile app to use as their wallet. If a farmer does not have a smart phone, they can use SMS texts to manage a cloud-hosted wallet. These farmers can login to their cloud-hosted wallet with a verification code to view and delete their credentials. These farmers can respond to offered credentials or verification requests through SMS texts.

A Dashboard for Merchants/Washing Station Managers

Farmer ID helps merchants create, issue, and verify receipts and digital documents that are sent to farmers. These receipts and documents are often recorded on paper in notebooks, which is hard to organization and verify. Most merchants operate washing stations and have an office with a computer. Merchants can use a web dashboard, called the Community Builder, to create and send receipts and payments to a farmer when a farmer comes to a washing station. Merchants can also view a history of the transactions, documents and licenses they have sent to farmers. Merchants can revoke farmer licenses that they have previously sent to farmers. Merchants can delete a connections with a farmer if they stop doing business.

Credential Types

The Farmer ID wallet provides a place for farmers to securely store all of their digitally verifiable credentials. The credential types that can currently be issued to their wallet are:

Identity cards
Transaction receipts
Payment receipts
Farm Information documents
Agronomy (farm) documents
Agronomy (soil and fertilization) documents These credentials are accessible to only the farmer and those they give access to via their (public) profile. A farmer's personal information can only be verified as legitimate if it comes from their wallet. There are two ways a farmer can receive a wallet: either a mobile wallet on a smart phone, or a cloud wallet that is managed by SMS.

Mobile Wallet

If a farmer has a smart phone, they can download a mobile wallet on the iOS or Android app stores to use on their phone. All the farmer's information will be stored on their mobile phone Mobile Wallet: Design Screenshots are shown at FIGS. 15-21.

Mobile Wallet: Features

Mobile Wallet: How a farmer is onboarded: In Community Builder: the farmer passes identifying information+valid phone number of their smart phone to the washing station manager, who then fills form & sends invitation SMS. The Farmer receives an invitation SMS on their phone:

"You've been invited to Farmer Connect. Click the link (LINK) to open it in the app"

The Farmer downloads the app from the App (or Google Play) Store. A Link in SMS opens the app, where the farmer can begin the registration process (selecting language, push notification settings etc.). After setup process is complete, an identity credential offer is sent to the farmer, and if accepted, an Identity credential is issued.

Mobile Wallet: How to receive Transactions & Payments receipts. The washing station manager initiates Transaction/Payment in the Community Builder. The Farmer receives a push notification in the Farmer ID app. Transaction & Payment receipts are issued to the wallet after farmer confirmation.

Mobile Wallet: How to receive Farm & Agronomy documents. The washing station manager initiates credential issuance in the Community Builder. The Farmer receives a push notification in the Farmer ID app. Credentials are issued to the wallet after farmer confirmation.

Cloud Wallet

A farmer that does not have a smart phone can be given a cloud wallet to store their credentials. Farmers can manage these credentials via a web interface.

Cloud Wallet: Design

Screenshots are shown at FIGS. 22-29.

Cloud Wallet: Features

Cloud Wallet: How a farmer is onboarded. In Community Builder: the Farmer passes identifying information+valid phone number of their smart phone to the washing station manager, who then fills in the form & sends an invitation SMS. As soon as a valid phone number is entered, the farmer receives an invitation SMS on their phone: "You are invited to claim your Farmer ID account with (Organization Name). Please share the (CODE) to claim." Once the code is shared and the account successfully claimed, the farmer can log in and view the wallet via www.farmerid.com.

Cloud Wallet: How to receive Transactions & Payments receipt. Transactions are automatically issued to the wallet; if a confirmation is required, the farmer receives an SMS with a code that has to be shown to the washing station manager. Transactions & Payments can be viewed in the tab Exchanges.

Cloud Wallet: How to receive Farm & Agronomy documents. Farm Licenses are automatically issued to the wallet; confirmations are not required. Farm Licenses can be viewed in the tab Credentials.

What happens if their phone is lost or number changed? Any (merchant) organization can send a request to support @farmerconnect.com to update the phone number of a farmer and the entire household of farmers will be updated to the newest number. They will use an offline verification process to compare the farmer's identity credential listed on the merchant dashboard to confirm the farmer is the same one. An email with the request will be sent to Farmer Connect; Farmer Connect will send a SMS to the old phone number to inform about the change; if no reply is given within a week, the phone number will be changed and the change logged. Farmers can also independently change their household phone number via the Cloud Wallet.

Community Builder

The Community Builder is a dashboard that allows merchants, in particular washing station managers, to build up & manage their community of farmers.

Community Builder: Design

Screenshots are shown at FIGS. 30-41.

Community Builder: Features

Community Builder: How a (merchant) organization is onboarded. Partner onboarding begins with registering the Merchant Organization on the Farmer Connect Platform. The Merchant Organization then has to register the respective users in the FC Platform. In a second step, the relevant products, facilities and currencies have to be registered in the FC Platform. These items will then become automatically available for use in the Community Builder.

Community Builder: How a farmer is onboarded. The washing station manager clicks on "Invite Farmer", after entering First & Last Name, most important selection is phone type (this determines wallet type and most of the flows later on).

Community Builder: Smart Phone. Farmer's phone number is mandatory. The Washing station manager enters the farmer's phone number and completes the rest of the Identity credential data fields. The Washing station manager clicks on "Register". The status changes to "Waiting for Farmer to Confirm Account"; Farmer receives SMS and sets up wallet. The Farmer accepts an Identity credential. The status is changed to "Connected".

Community Builder: Flip Phone: The farmer's phone number is optional.

Community Builder: Flip Phone: With phone number: The washing station manager enters the phone number and completes the rest of the identity credential data fields. The washing station manager clicks on 'Register'. The cloud wallet is created; the identity is issued. Back in the "farmers" tab, the farmer status changes to "Confirm". In the Farmer's tab, the washing station manager can click on "Confirm" (next to farmer phone number). This triggers a SMS in the backend and opens an input field for the farmer code. The farmer receives a SMS with an invitation text and code "You are invited to claim your Farmer ID account with (Organization Name). Please share the code (Code) to claim." The farmer shows the code to the washing station manager; the washing station manager enters the code in the field; if the code matches the one stored in the backend, status changes to "Connected". The farmer receives SMS with confirmation text "Welcome to Farmer ID. You are now able to access your cloud wallet via (Link)."

Community Builder: Flip Phone: Without Phone number. The washing station manager leaves the phone number field blank but completes the rest of the identity credential data fields. The washing station manager clicks on "Register". The cloud wallet is created, and the identity credential is issued. Back in the "Farmer's" tab, the farmer status changes to "Claim". Time passes. When the flip phone farmer would like to claim their account, they have to visit the washing station. The washing station manager can click on "Claim" (in the "Farmers" tab, phone number column), and an overlay opens. In the overlay, the washing station manager can enter the farmer's phone number and click on "Send Code" (next to farmer phone number); this triggers a SMS in the backend. The farmer receives the SMS with invitation text and code: "You are invited to claim your Farmer ID account with (ORGANIZATION NAME). Please share the code (CODE) to claim.". The farmer shows code to the washing station manager. The washing station manager enters the code in the field; if the code matches the one stored in the backend, the status changes to "Connected". The farmer receives SMS with confirmation text "Welcome to Farmer ID. You are now able to access your cloud wallet via (LINK).

Community Builder: How to make Transactions & Payments. The washing station manager initiates Transactions/Payments process by clicking on "Exchange" and fills in the transaction details.

Smart Phone: The Transaction/Payment request is sent to the farmer. The farmer receives a push notification on their phone. After accept/decline, credentials are issued to wallet; platform documents are uploaded. Payload-Confirmed is uploaded with value TRUE/FALSE (depending on farmer answer)

Flip Phone. The washing station manager fills the Transaction/Payment details and selects if it has to be confirmed. After clicking on "Submit", all platform documents except Payload-Confirmed are uploaded. If "Request farmer confirmation" was selected: the washing station manager can navigate to the "Exchanges", find the respective transaction and click on "Confirm"; a confirmation request SMS (including code) is sent to the farmer. The farmer receives a SMS with transaction details and code "TRANSACTION with (ORGANIZATION NAME): (AMOUNT) (UNIT) of (PRODUCT) for (CURRENCY)(PRICE). Please share the code (CODE) to confirm." Or "PAYMENT from (ORGANIZATION NAME)(CURRENCY)(PRICE). Please share the code (CODE) to confirm." The farmer shows code to the washing station manager; washing station manager clicks "Confirm" button and code is confirmed. Credentials are issued and Payload-Confirmed is uploaded with value TRUE (or FALSE if "Request farmer confirmation" was not selected).

How to issue Farm & Agronomy documents:

Smart Phone: Usual flow with push-notification for request.

Flip Phone: The washing station manager initiates credential issuance process by clicking on "Issue" and fills in the credential details. Credentials are issued without farmer confirmations directly to the wallet. Provided the account status is "Connected", the farmer receives an SMS with message. "(ORGANIZATION NAM)☐ issued you a new credential—login via (LINK) to view it."

Partner API

Partner API: Overview

Organizations that do not want to use the Community Builder dashboard but still want to enable Farmer ID functionality in their own applications can do so by using the Partner API instead. In this case, almost all (farmer) data will be stored on partner systems; Farmer Connect will primarily store information around farmer connections+phone numbers.

Partner API Onboarding: Partner onboarding begins with registering the Partner Organization on the Farmer Connect Platform. The partner organization has to then register a Service ID on the platform. When registering such a service, the partner organization is provided with a Service API Key which will later be used through the Partner API. The Partner Organization then has to register the respective users in the FC Platform. In a second step, the relevant products, facilities and currencies have to be registered in the FC Platform. These items will then become automatically available for use in the Partner API.

Partner API General Behavior. On the Partner API side, as a part of the initiation process, the partner should define a webhook which will be later used to inform the partners about the outcomes of the credential issue process; the Partner API provides an endpoint for that. There are distinct endpoints for all the different credentials. All endpoints i.e. action taken return 200 or 400 status codes depending on the entry. Only the Farmer Onboarding returns an identifier which identifies the farmer i.e. the connection identifier. This identifier is later used in every action taken on a certain farmer's behalf. On every action taken i.e. credential issued partners will send an additional property, their own identifier (string) which marks the action taken. This identifier will later be used as a part of the response via webhook that will be triggered on partners side to signal the status of the action. The process of issuing credentials ends with a webhook call. The webhook call consist of the partner identifier which identifies the action, message type which describe the state of the action (if we decide to send webhook notifications during the process and not only at the end), and a dictionary which will consist of the issued Credential Id. The Credential Id can be later used for revoking credentials. Partner API provides an endpoint for revoking credent. For flip phone users, only Transaction & Payment receipts will need farmer approvals. All other credentials are issued automatically.

Partner API Features

Partner API: How to authenticate. We provide an endpoint which accepts the Service API key (provided by IBM when creating a Service Account)+Organization ID in the request and returns IBM JWT token in the response. The JWT token is expected in every call to the partner API in the authorization header.

Partner API: How a farmer is onboarded. Partner API provides an endpoint for onboarding a farmer. Apart from the information needed in the credential, partners should send an identifier (string) which will label the action. This identifier will be returned by the Partner API in the webhook call back to the partners together with the action outcome (credential id will not be part of the response because identity credentials are not revokable). When invoking the farmer onboarding process, a connection identifier is returned to the partner as part of the immediate request/response exchange. This connection identifier is what couples the farmer in both systems. This identifier (guid) is then sent as a part of every credential issuance action for a certain farmer.

Partner API How to make Transactions & Payments. Partner API provides 2 endpoints for transactions, one for transactions and one for payments. They both expect, apart from the credential info, a partner identifier (i.e. action identifier) and a connection identifier (i.e. farmer identifier, issued by the Partner API□. At the end of the process a webhook is triggered. The dictionary in the webhook will consist of IBM related info for the transaction, and not a credential id, as transaction credentials cannot be revoked.

Partner API How to issue Farm & Agronomy documents. Farm, Agronomy and Soil credential are issued as any other. Partner identifier and connection identifier are expected in the request, apart from the credential data. Credential Id is returned back to the partner via webhook so that the partner can revoke them later.

Consent Management

Consent Management helps farmers control what information is getting shared about them online. It helps organizations receive personal information about a farmer and know that the information was explicitly consented to be shared by that farmer. This enables e.g. the Thank My Farmer App to display personal information about the farmer in the app without needing to keep a database full of personal information about that farmer. It also enables farmers to have platform where they can show their verifiable credentials to the world, right from their phone.

Consent Management: Overview. The main use case will be in the Enterprise/Business context (e.g. sustainability reporting where a company has to show that they are buying sustainably sourced coffee, or via a brand's product in Thank My Farmer). A wallet holder can specify which credentials they want to share, and then they give their consent on it.

As a farmer: I understand the implications of what it means to publish a credential; I can specify certain credentials and attributes to be shared publicly; I can organize and manage these published credentials in my Profile view in my wallet; I can fill in my Profile with my personal information stored in my (identity) credentials; I can add credentials to my Profile that I want the world to see.

Consent Management: Profile Management. How to add consented attributes from credentials to the Profile. Required: Farmer has at least one identity or farm credential in their wallet. When a farmer would like to update their Profile, they can select a credential from the list of identity & farm credentials in the wallet. When a farmer has chosen a credential, they can then choose which attributes of that credential they would like to add to their Profile. When they want to save the credential to their profile, then they can click a button to give consent and save those attributes to their profile.

Consent Management: How to view your profile. When a Farmer opens their wallet, then they can view a navigation item to their Profile page. When a farmer views their profile page, then they can see their personal information and the credentials that they've given consent to share. When a farmer taps on a credential in their profile, then they can view the subset of attributes of that credential that they've consented to share.

Farmer URN Service. Authentication: Same authentication as for the Partner API. How to resolve a URN: Send a GET request to the API to get a structured j son of the public information about that Farmer URN. Using proofs, a user is blinding information across organizations, and shows which information they want published for each URN.

Appendix 2

In this Appendix 2, we list six features, each with a number of optional features. The six features are:

Feature 1. Overall Farmer Connect "connected ecosystem"

Feature 2: An analytics layer sitting on top of a supply-chain blockchain-based platform Feature 3: A blockchain-based platform with sustainability reporting capability Feature 4: Mobile application that provide a unique farmer ID that gives a farmer the control of their own identity within a supply chain blockchain based platform Feature 5. A consumer app that gives consumers visibility over, and the ability to trace, all transactions that link the final product to the farmer Feature 6: A consumer app that gives consumers the ability to make and track donations & payments to farmers.

Note that any of these six features can be combined with one or more of the other features, and any of the optional features. Any of the optional features can be combined with one or more of the other optional features.

Feature 1. Overall Farmer Connect "Connected Ecosystem"

The Farmer Connect system is an end to end agricultural ecosystem that uses mobile devices with digital certificates, stored either on the device or in the cloud, with dual confirmation (at a minimum) to start a trace at the level of physical goods production.

Physical goods, references to digital certificates, and the exchange of currency (traced as if it were a physical good) are tracked within the same contracting reference. The yield of each product conversion, whether physical or digital, is calculated and stored. A user can trace a chain using a reference code, a product, a location, and limit or filter the results returned by counterparty, digital certificate, facility certification, date range, number of steps from the reference, or type of facility/product. This information is available via API for consumption by other systems, and feeds into two organic systems: an enterprise dashboard, integrated with artificial intelligence, that analyzes volumes and yields (or other variables) on the trace to identify and visually highlight outliers, and a consumer application or web page which uses product descriptions, an interactive map, and interactive content such as crowdfunding projects, wikis, and social media content to engage consumers with full analytics provided to enterprise customers on a contractual basis.

Platform billing: A company signs a contract with FC and is given a blockchain account with a system administrator. The system administrator can sign up other users as system administrators, read/writers, write only, or read only, and removes FC's access to the unencrypted data. FC can restore a company's access to the system at the request of the owner's lawful representatives. Multiple legal entities in a holding structure can have their own accounts, they are billed by units of measure brought into the account from outside or created within their accounts with a single invoice and transactions between those accounts are excluded from billing through a whitelist. The billable entry is responsible for its own internal accounts receivable process and provides FC a guarantee of the other companies' payment.

Non-repudiation: Participants on the blockchain sign an agreement that a transaction reflecting a change of ownership between two participants, which is uploaded or referenced in both their respective accounts, a digital certificate signed by both parties, or a smart contract to that effect, is evidence of a written commercial agreement signed by the users involved and authorized by the company's directors, and therefore binding in the eyes of local law or arbitration. Participants agree that, should a dispute arise between two participants, Farmer Connect shall verify through a comparison of existing encrypted data with alleged encrypted data, whether such a transaction was evidenced and provide such proof to the legal or arbitration authority without granting said authority access to the participants unencrypted data. It is the responsibility of the accuser to provide the exact alleged content to be verified. Users or organizations found to have overwritten or revoked permissions on a transaction without evidence of an accompanying verbal or written agreement may face other penalties or liability from Farmer Connect for breaching the terms of use.

We can generalise to a system in which a farmer directly confirms the purchase of goods within a supply chain blockchain-based platform via a mobile app. More specifically, we have:

A computer implemented blockchain-based system for agricultural products that enables a transaction associated with a producer (e.g. farmer or group of farmers, or small holders—such as coffee farmers, or tobacco farmers, or any other crop) to be captured on the blockchain-based system and associated with a digital ID for that producer;

and for transactions made by one or more entities when handling or processing goods from that producer to be captured on the blockchain-based system; and for a consumer to be able to view or verify one or more of these transactions, or trace goods from that producer, using the blockchain-based system.

Optional features:
Each of the separate entities have individually set permission levels
Blockchain is private
the blockchain-based system enables multiple traces to be run in parallel, or simultaneously, or consolidated
the blockchain-based system enables the results of one or more traces or other analytics to be overlaid onto a map (e.g. physical map of places, or logical map of processes)
consumer can, via an application, make a money payment to or for the producer;
the money payment by-passes the entities handling or processing goods from that producer
the money payment is handled as though it was a physical item by the blockchain-based system
Physical goods, references to digital certificates, and the exchange of currency, traced as if it were physical goods, are tracked within the same contracting reference
money payment is traceable by the consumer
producer records impact or use of payments on the blockchain-based system to enable the consumer to view impact or use
the blockchain-based system constitutes a universal data standard regardless of the identity of any specific producer or end-user
A user can trace a chain using a reference code, a product, a location, and limit or filter the results returned by counterparty, digital certificate, facility certification, date range, number of steps from the reference, or type of facility/product.
This information is available via API for consumption by other systems, and feeds into two organic systems: an enterprise dashboard, integrated with artificial intelligence, that analyzes volumes and yields (or other variables) on the trace to identify and visually highlight outliers, and a consumer application or web page which uses product descriptions, an interactive map, and interactive content such as crowdfunding projects, wikis, and social media content to engage consumers with full analytics provided to enterprise customers on a contractual basis Computer implemented blockchain-based method for processing a transaction request for purchasing goods within a supply chain, the method comprising the steps of:
(i) receiving a transaction request initiated by an end-user using an application (e.g. a mobile application for a smartphone or tablet etc.),
(ii) processing the transaction request and creating a digital transactional credential,
(iii) sending the digital transactional credential to the producer of the goods (e.g. via another application, such as a mobile application), and
(iv) recording the transaction onto the blockchain once it has been authorised or confirmed by the producer (e.g. farmer or group of farmers, or small holders—such as coffee farmers, or tobacco farmers, or any other crop).

Optional features:
Authorisation/confirmation is given when a set of pre-defined rules have been satisfied [e.g. such as the payment of the goods has been received];
Authorisation/confirmation is input by a producer into an application (e.g. an application for their smartphone)
Authorisation/confirmation is stored on the producer's application;
End-user is any party in the supply chain connected to the producer, such as distributor, consolidator, exporter, importer, roaster, food processor, customs agent, retailer, consumer.
Self-sovereign identity certificate is used to access the blockchain;
Digital transactional credential includes goods related metadata such as volume, price, quality;
Digital transactional credential is verified by both the producer and the end-user;
Any subsequent transaction events relating to the goods is recorded onto the blockchain;
A permanent digitized chain of transactions between each entities of the supply chain is recorded onto the blockchain;
Each transaction output is calculated and recorded onto the blockchain;
Both the end-user and producer are able to trace the goods journey via their own app;
Each peer or node or subsystem of the blockchain is able to set permissions on how its data is being used or accessed;
Method provides full end to end transparency on the provenance and journey of goods.
Blockchain enables all separate entities that are part of the supply chain to have separate permission levels attributed to them (e.g. by the producer, or an entity with operational control over the system.
System enables multiple tracing, e.g. multiple products, or a product and payments, all ingredients for a finished product; may be simultaneous
System enables the consolidation of multiple traces; may be simultaneous
System enables the results of multiple traces to be overlaid onto a geographic or logical map, e.g. to aid analysis.
System constitutes a universal data standard regardless of the identity of any specific producer or end-user
Blockchain implements Incoterms smart contracts
Participants on the blockchain sign an agreement that a transaction reflecting a change of ownership between two participants, which is uploaded or referenced in both their respective accounts, a digital certificate signed by both parties, or a smart contract to that effect, is evidence of a written commercial agreement signed by the users involved and authorized by the company's directors, and therefore binding in the eyes of local law or arbitration.

Feature 2: An Analytics Layer Sitting on Top of a Supply-Chain Blockchain-Based Platform A system administrator can create a digital identity management dashboard based on their parent enterprise account, and they can give account users rights to transact on the company's behalf. An analytics layer feeds into the management dashboard. An account user has read/write permissions on the blockchain. When they only have write-permissions (for example, a contractor or middleman), their system administrator's login or a service ID is used to retrieve data necessary to execute transactions, such as lists of approved products or facilities, for the transaction. This allows agents and third parties to enter and log transactions on a company's behalf in areas where that company does not have infrastructure, including in hinterland areas and foreign countries.

We can generalise to:

A supply chain tracking platform comprising a blockchain layer that processes goods related transactions within a supply chain and an analytics layer that sits on top of the blockchain layer and that receives goods related data from the blockchain layer and analyses this data, such as any of the following: consumer, vendor, retailer, wholesaler, transporter, input and output of each transaction, everything that has been used to produce the goods/product.

Multiple categories of goods are tracked simultaneously;
Consumer and goods are tracked simultaneously;
Tracking is performed in real time;
Supply chain transactions are extracted and mapped out within the analytics layer;
When the purchase of goods has been authorised within the blockchain layer, an interactive map of the journey of the goods is displayed to the purchaser of the goods on a mobile app.
the journey of the goods includes any transactional events relating to the goods from the purchase transaction request to the delivery of the goods.
Analytics layer feeds data into a dashboard or application or a web page.
Platform is scalable to any supply chain architecture.
Blockchain is a private blockchain.

Feature 3: A Blockchain-Based Platform with Sustainability Reporting Capability

Currently, sustainability reporting is inconsistent and unreliable; major buyers of agricultural goods (e.g. retailers; coffee shop chains etc.) increasingly demand accurate, fast, comprehensive and auditable sustainability reports, but conventional systems are unable to meet these challenges. The Farmer Connect system can.

We can generalise to:

A supply chain tracking platform comprising (i) a blockchain layer that processes agricultural goods related transactions within a supply chain and (ii) a reporting layer that sits on top of the blockchain layer and that receives data describing sustainability aspects of those goods and the related transactions and generates reports relating that data to pre-defined sustainability criteria.

Optional features:
multiple categories of goods are tracked simultaneously.
multiple consumers and goods are tracked simultaneously.
tracking is performed in real time.
supply chain transactions are extracted and mapped out within the reporting layer.
when the purchase of goods has been authorised within the blockchain layer, an interactive map of the journey of the goods is generated.
the journey of the goods includes any transactional events relating to the goods from the purchase transaction request to the delivery of the goods.
the reporting layer feeds data into a dashboard or application or a web page.
the platform is scalable to any supply chain architecture.
the blockchain is private.
the blockchain-based system enables multiple traces to be run in parallel, or simultaneously, or consolidated.
the blockchain-based system enables the results of one or more traces or other analytics to be overlaid onto a map (e.g. physical map of places, or logical map of processes.
authorisation/confirmation is given when a set of pre-defined rules have been satisfied, e.g. such as the payment of the goods has been received.
authorisation/confirmation is input by a producer into an application (e.g. an application for their smartphone).
authorisation/confirmation is stored on the producer's application.
an end-user is any party in the supply chain connected to the producer, such as distributor, consolidator, exporter, importer, roaster, food processor, customs agent, retailer, consumer.
a self-sovereign identity certificate is used to access the blockchain.
a digital transactional credential includes goods related metadata such as volume, price, quality.
a digital transactional credential is verified by both the producer and the end-user.
which any subsequent transaction events relating to the goods is recorded onto the blockchain
a permanent digitized chain of transactions between each entities of the supply chain is recorded onto the blockchain
each transaction output is calculated and recorded onto the blockchain
both the end-user and producer are able to trace the goods journey via their own app.
each peer or node or subsystem of the blockchain is able to set permissions on how its data is being used or accessed.
the platform provides full end to end transparency on the provenance and journey of goods.
the blockchain enables all separate entities that are part of the supply chain to have separate permission levels attributed to them (e.g. by the producer, or an entity with operational control over the system.
the platform enables multiple tracing, e.g. multiple products, or a product and payments, all ingredients for a finished product.
the platform enables the consolidation of multiple traces.
the platform enable the results of multiple traces to be overlaid onto a geographic or logical map, e.g. to aid analysis.
the platform provides a universal data standard regardless of the identity of any specific producer or end-user.
the blockchain implements Incoterms smart contracts.

physical goods, references to digital certificates, and the exchange of currency, traced as if it were physical goods, are tracked within the same contracting reference.

participants on the blockchain sign an agreement that a transaction reflecting a change of ownership between two participants, which is uploaded or referenced in both their respective accounts, a digital certificate signed by both parties, or a smart contract to that effect, is evidence of a written commercial agreement signed by the users involved and authorized by the company's directors, and therefore binding in the eyes of local law or arbitration.

a user can trace a chain using a reference code, a product, a location, and limit or filter the results returned by counterparty, digital certificate, facility certification, date range, number of steps from the reference, or type of facility/product.

information is available via API for consumption by other systems, and feeds into two organic systems: an enterprise dashboard, integrated with artificial intelligence, that analyzes volumes and yields (or other variables) on the trace to identify and visually highlight outliers, and a consumer application or web page which uses product descriptions, an interactive map, and interactive content such as crowdfunding projects, wikis, and social media content to engage consumers with full analytics provided to enterprise customers on a contractual basis.

Feature 4: Mobile Application that Provide a Unique Farmer ID that Gives a Farmer the Control of their Own Identity within a Supply Chain Blockchain Based Platform Credentials and custodianship: A digital ID user can have a digital identity on their device or stored for them on the cloud, divided between behavioral credentials and transaction credentials. They can transfer their account to another device. They are also able to give someone else guardianship (a friend or a counterparty) in that the other person can recover their account for them, but that they would be notified of the attempt on their registered device if they still had it. They can log into their account from a computer provided they have access to their registered device. The digital ID user can initiate a transaction with another digital ID user, but such a transaction is only saved to the users' credentials. Each transaction or behavioral certificate has a trust value based on the two counterparties involved and can be further verified by 3rd parties to increase that trust.

Credit score/Trust score: An enterprise or an individual can have a digital ID with behavioral and transactional certificates. Both individual and enterprise wallets enable automated and zero-proof KYCs for a variety of applications. The digital ID user can compile a report of their certificates verified by their counterparties. A counterparty can exclude certifications that are below a certain trust score from the report or calculation. This report can be compiled into a numerical score either according to Farmer Connect formulas or according to custom formulas that determine a digital ID user's worthiness to receive a service, credit, awards, or any other benefit the counterparty may be able to issue. In conjunction with a marketplace, this may include the automatic disbursement of benefits or privileges such as physical access to a location or payment of a grant or other income, and in the context of smart contract this may be the determinant of a contract award or eligibility to bid or offer on a contract.

Transactions: An enterprise or an individual can have a digital ID with behavioral and transactional certificates. An enterprise account user can form a relationship with a digital-ID-only user registering them as a "farmer" (for example) with their company under a unique hash code. When an account user initiates a transaction with a farmer, the transaction is saved to the farmer's digital wallet as a digital credential and also written to the FC blockchain on both a common farmer account with a system ID (with the farmer's hash) and the account user's organization with the account user's ID or a system ID. An established farmer or enterprise can have their own FC blockchain enterprise account and create their own transactions to other accounts with full cryptographic proof or use Farmer ID to have both digital ID credentials and a blockchain trace by logging in with their enterprise account.

Both individual and enterprise wallets enable automated and zero-proof KYCs for a variety of applications. The digital ID user can compile a report of their certificates verified by their counterparties. A counterparty can exclude certifications that are below a certain trust score from the report or calculation.

Figure 42:
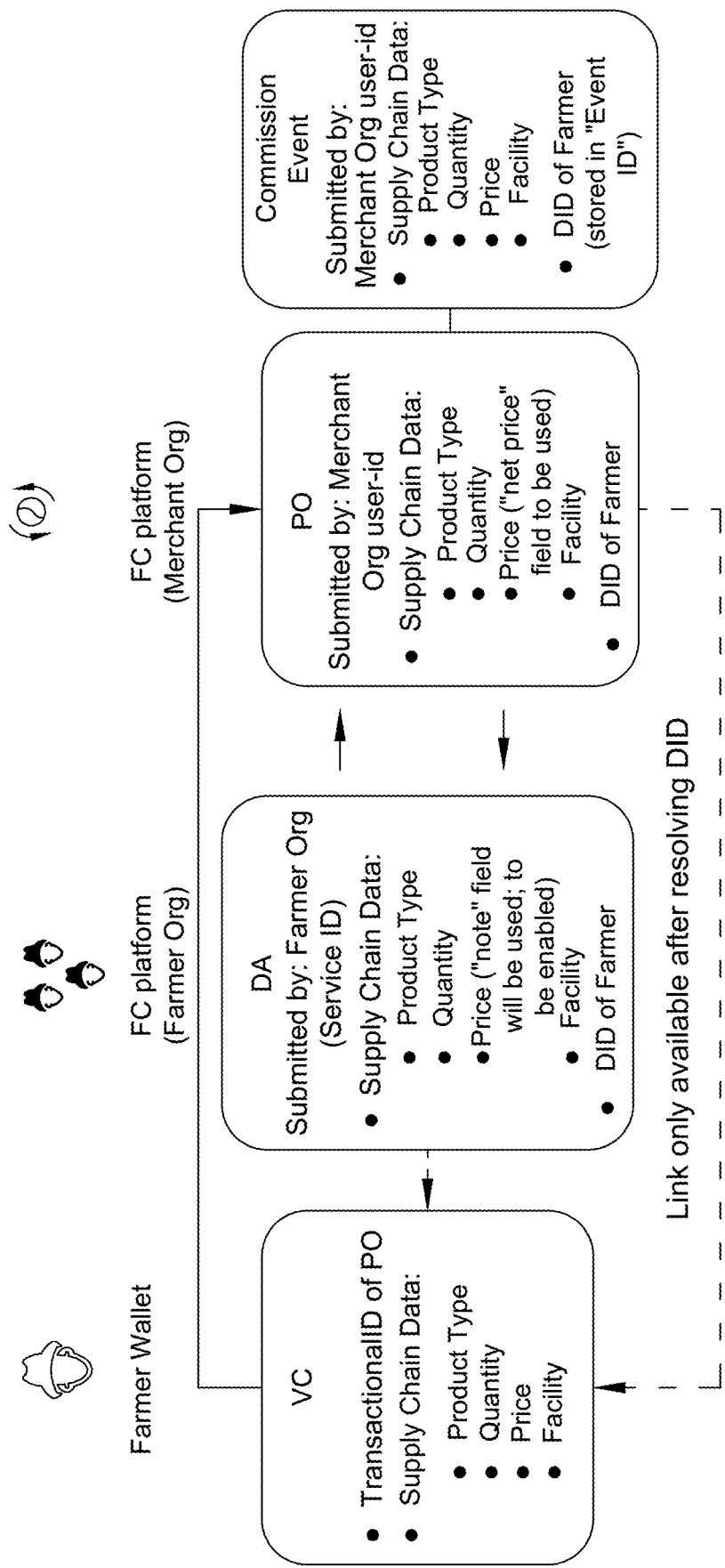
FIG. 42 below depicts the Farmer Connect approach to creating a trusted link between the farmer and the merchant.

Transactions (detailed): The FIG. 42 below depicts Farmer Connect's approach to create a trusted link between the farmer and the merchant:

Transactions (identity)

Difficulty lies in reconciling the two seemingly opposite approaches to identity management in the Farmer application and the FC platform. On the platform, merchants/organizations are clearly identified due to the nature of the supply chain as well as the FC platform being a permissioned blockchain. In the Farmer application, we are dealing with households/farms and potentially sensitive data on an individual level. Access to this data should only be granted by the individual it concerns.

Process optimization: Blockchains depend on a continuous chain of custody to link events generated by different organizations. As commodity supply chains depend on the booking and execution of contracts that will be fulfilled months or years in the future, the abstraction of a future representation of physical goods is necessary to enable a trace to a product that does not yet exist, whose reference numbers and counterparties are yet unknown, to permit the creation of a forward flowing chain that is searchable from the initial contract references. This concept allows an interested commercial or service providing third party to look up a trace to a product that has not yet been delivered or does not yet exist and is essential to the normal execution of business.

Process optimization (detailed)

Figure 43A:
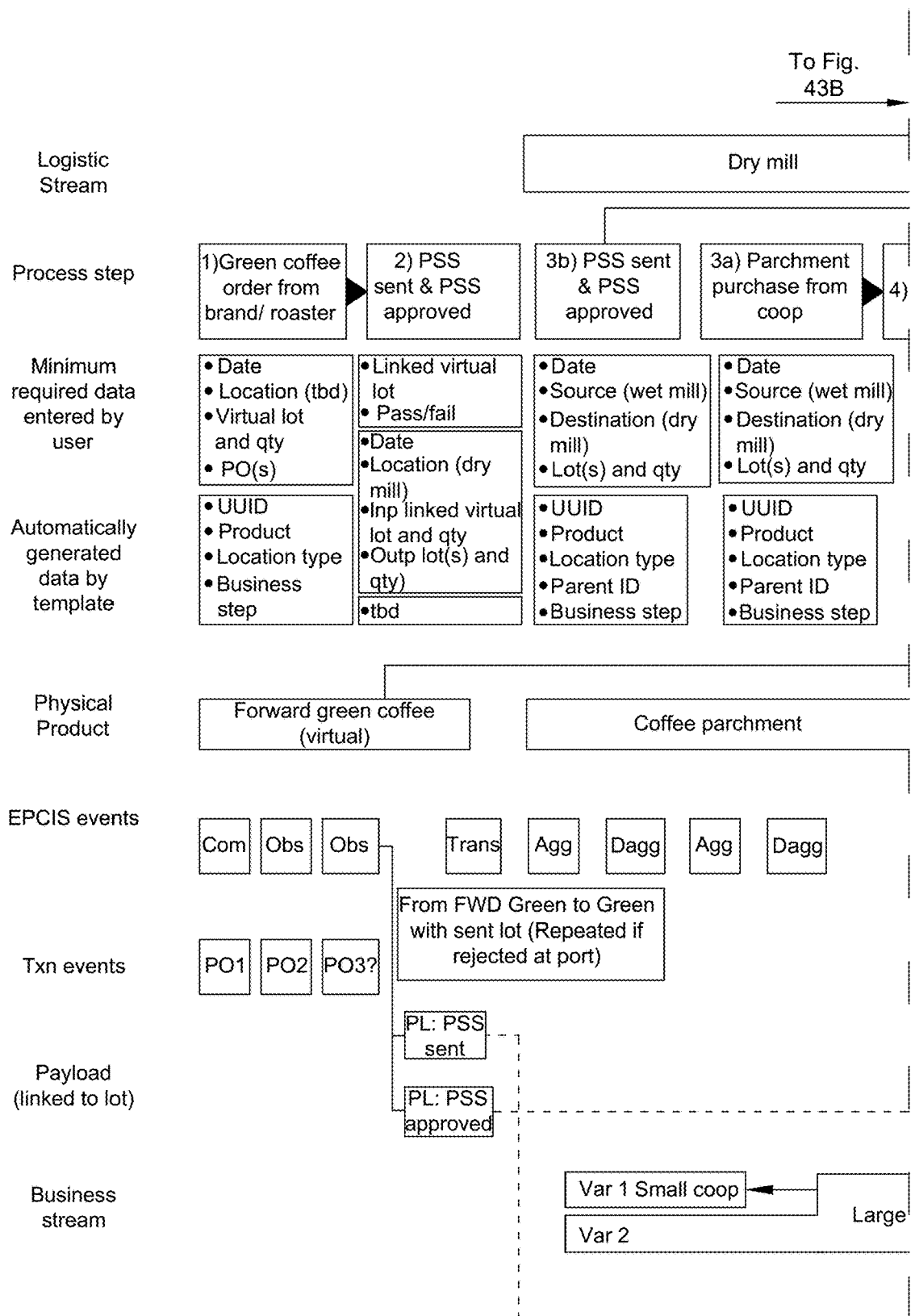
FIGS. 43A and 43B illustrates a schema to predict inventory levels through increased visibility in the supply chain.
Figure 43B:
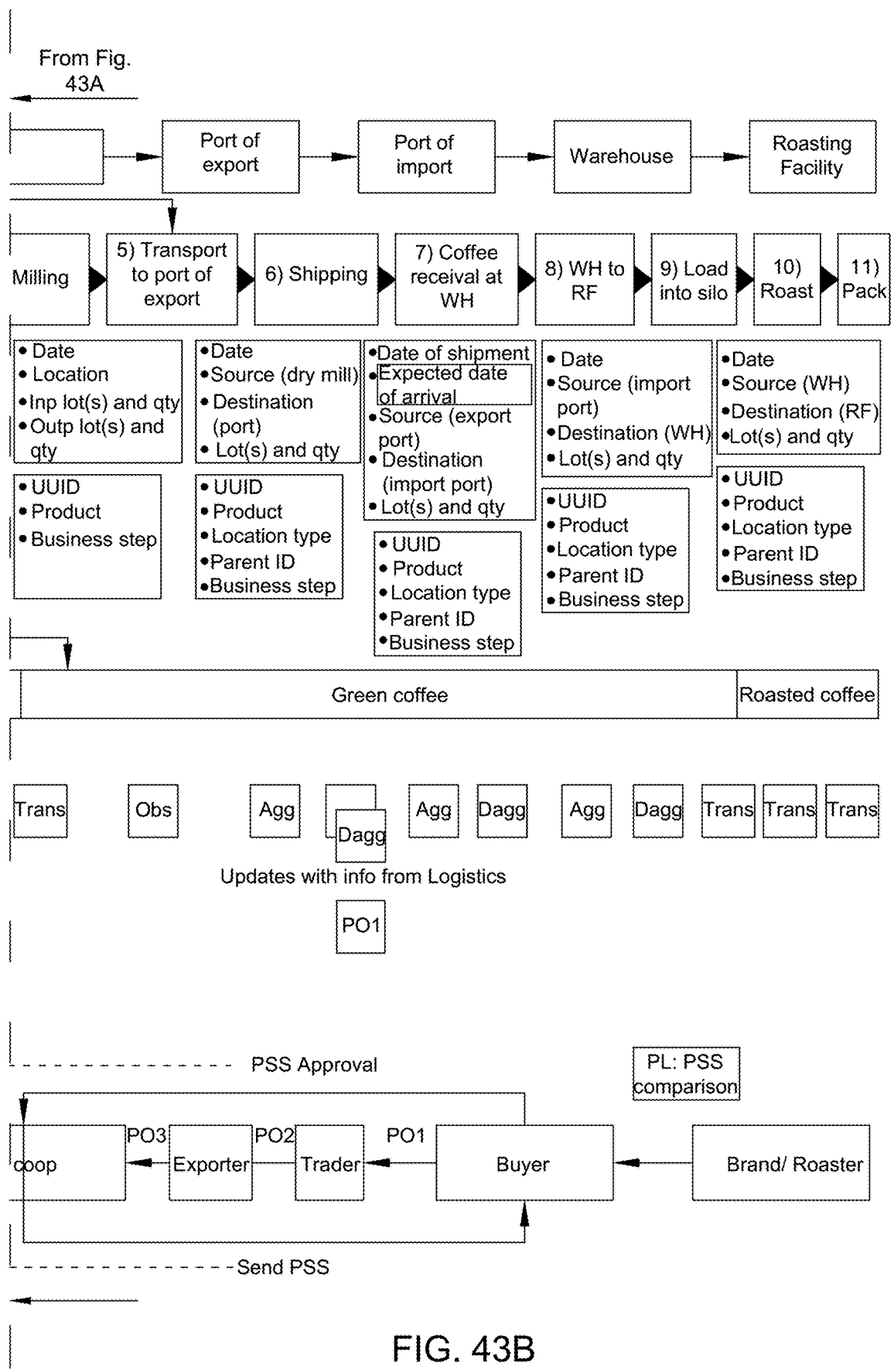

Schema to predict inventory levels through increased visibility in supply chain, e.g. container arrival date is shown below in FIG. 43.

We can generalise to:

A mobile application providing a unique digital ID that gives an end-user, such as a producer of agricultural products, control over their identity on a supply chain blockchain based platform, in which the digital ID relates to, or is divided between, transaction credentials and behavioural credentials and in which the digital ID is associated with a trust score or value.

Optional features:

Digital ID is stored on the mobile device on which the application is running or on the cloud;

Digital ID is not stored on the blockchain

End-user can give guardianship to their digital ID to another used;

End-user can initiate a transaction with another user that has a digital ID;

Transaction is saved to both user's transaction credentials once it has been approved by both users;

Transaction or behavioural credentials are associated with a trust value score on a counterparty involved in a transaction;

Trust value can be further verified and updated by 3rd parties;

Personal or sensitive information of the end-user is not recorded onto the blockchain;

End-user sets permissions on how its own data is being used or accessed

The supply chain blockchain based platform integrates with a consumer application The digital ID user can initiate a transaction with another digital ID user, but such a transaction is only saved to the users' credentials.

Each transaction or behavioral certificate has a trust value based on the two counterparties involved and can be further verified by 3rd parties to increase that trust.

When an account user initiates a transaction with a farmer, the transaction is saved to the farmer's digital wallet as a digital credential and also written to the blockchain on both a common farmer account with a system ID (with the farmer's hash) and the account user's organization with the account user's ID or a system ID.

the abstraction of a future representation of physical goods enables a trace to a product that does not yet exist, whose reference numbers and counterparties are yet unknown, to permit the creation of a forward flowing chain that is searchable from the initial contract references.

an interested commercial or service providing third party is able to look up a trace to a product that has not yet been delivered or does not yet exist Feature 5. A Consumer App that Gives Consumers Visibility Over, and the Ability to Trace, all Transactions that Link the Final Product to the Farmer We can generalise to:

A computer implemented blockchain-based system for agricultural products that enables a transaction associated with a producer (e.g. farmer or group of farmers, or small holders—such as coffee farmers, or tobacco farmers, or any other crop) to be captured on the blockchain-based system and associated with a digital ID for that producer;

and for transactions made by one or more entities when handling or processing goods from that producer to be captured on the blockchain-based system; and for a consumer, using an application running on a smartphone or other connected computing device, to be able to view, and/or verify one or more of these transactions, and/or trace goods from that producer, using the blockchain-based system.

Optional features:

each of the separate entities have individually set permission levels.

the blockchain is private.

the blockchain-based system enables multiple traces to be run in parallel, or simultaneously, or consolidated.

which the blockchain-based system enables the results of one or more traces or other analytics to be overlaid onto a map (e.g. physical map of places, or logical map of processes).

the consumer can, via an application, make a money payment to or for the producer.

the money payment by-passes the entities handling or processing goods from that producer.

the money payment is handled as though it was a physical item by the blockchain-based system.

goods, references to digital certificates, and the exchange of currency, traced as if it were physical goods, are tracked within the same contracting reference.

any money payment is traceable by the consumer.

the producer records impact or use of payments on the blockchain-based system to enable the consumer to view impact or use.

the blockchain-based system constitutes a universal data standard regardless of the identity of any specific producer or end-user.

a user can trace a chain using a reference code, a product, a location, and limit or filter the results returned by counterparty, digital certificate, facility certification, date range, number of steps from the reference, or type of facility/product.

information is available via API for consumption by other systems, and feeds into two organic systems: an enterprise dashboard, integrated with artificial intelligence, that analyzes volumes and yields (or other variables) on the trace to identify and visually highlight outliers, and a consumer application or web page which uses product descriptions, an interactive map, and interactive content such as crowdfunding projects, wikis, and social media content to engage consumers with full analytics provided to enterprise customers on a contractual basis.

a consumer application provides a consumer end-user access to a supply chain blockchain based platform, and in which the application displays to the end-user a list of agricultural goods based on the end-user search criteria, such as geographical location, current or future availability, expected delivery, producer digital ID credentials, producer trust score.

a consumer application provides a consumer end-user access to a supply chain blockchain based platform that defines traceability for agricultural goods, and in which the application displays to the end-user a screen or menu option that when selected causes a message or communication from the consumer end-user to be associated with a producer (e.g. a farmer or group of farmers etc.) that produces the goods or ingredients or constituents for the agricultural goods.

Feature 6: A Consumer App that Gives Consumers the Ability to Make and Track Donations & Payments to Farmers.

Currency, whether in digital, crypto, or physical form, is traced on the FC blockchain as if it were a physical good such as a suitcase full of hard currency. The currency is transferred, converted to other currencies or physical goods, and traced the same way a physical good would be. This allows a trace to be run on it. In some countries, over 60% of charitable donations do not end up being used to benefit the intended beneficiary, and all projects have cost overruns. By requiring each participant to log in and verify the transmission or receipt of funds or funds that have been converted to goods, and making that trace transparent, a project owner can increase the amount of collusion required for misappropriation and ensure that should such collusion be discovered, a permanent record of that user's activity is present and available. This will allow not only better visibility and compliance, but also allow more flexibility in contracting which will reduce the cost of services provided to projects.

We can generalise to:

A consumer application providing a consumer end-user access to a supply chain blockchain based platform that defines traceability for agricultural goods, and in which the application displays to the end-user a screen or menu option that when selected causes a traceable payment from the consumer end-user to be associated with a producer (e.g. farmer or group of farmers etc.) that produces the agricultural goods or ingredients or constituents for the goods.

Optional features:
traceable payment is handled or processed by the blockchain
traceable payment is handled or processed as physical goods on the blockchain
traceable payment enables 2-sided confirmation (e.g. consumer can trace payment and confirm to the producer that payment has been made; producer can trace payment and confirm to the consumer that payment has been received).
Traceable payment moving cross border can be made to an accountable third party who is money laundering compliant
Traceable payments can be subject to traceable netting off to minimise net amounts transferred
Consumer application enables a consumer to select goods, or packaged goods (e.g. by scanning a bar code on the goods or their packaging) and then automatically displays to the end-user the screen or menu option that when selected causes a traceable payment from the consumer end-user to be associated with a producer (e.g. farmer or group of farmers etc.) that produces the goods or ingredients or constituents for the selected goods.
Consumer application is configured to display sustainability projects linked to a list of agricultural goods the end-user intends to buy or is interested to buy or has previously purchased or is linked to producers the end-user has previously interacted with; and displays how the traceable payment was used and its impact
Consumer application enables a consumer to identify goods, or packaged goods, based on the search criteria, such as geographical location, current or future availability, expected delivery, producer digital ID credentials, producer trust score and to order those goods, whether available now or as a pre-financing against future crops
Consumer application enables a consumer to identify goods, or packaged goods and purchase those goods directly from the producer.
Consumer application enables a consumer to identify producers, selected to meet a consumer-defined risk of default/financial return profile and enables the consumer to invest directly or indirectly in one or more producers that meet the risk/return profile by sending a traceable payment from the consumer end-user to be associated with the selected producer.
The traceable payment is a smart contract for verifiability
A producer has an independent trust score that is displayed on the consumer app
End-user is able to setup the producer with a pre-financing model to help with the production of specific goods.
By requiring each participant to log in and verify the transmission or receipt of funds or funds that have been converted to goods, and making that trace transparent, a project owner increases the amount of collusion required for misappropriation and ensure that should such collusion be discovered, a permanent record of that user's activity is present and available.
Consumer application providing a consumer end-user access to a supply chain blockchain based platform, and in which the application displays to the end-user a list of agricultural goods based on the end-user search criteria, such as geographical location, current or future availability, expected delivery, producer digital ID credentials, producer trust score.
Consumer application providing a consumer end-user access to a supply chain blockchain based platform that defines traceability for agricultural goods, and in which the application displays to the end-user a screen or menu option that when selected causes a message or communication from the consumer end-user to be associated with a producer (e.g. a farmer or group of farmers etc.) that produces the goods or ingredients or constituents for the agricultural goods.

The invention claimed is:

1. A supply chain tracking platform comprising:
(i) a blockchain layer that is configured to process agricultural goods related transactions within a supply chain; and
(ii) a reporting layer that sits on top of the blockchain layer and that is configured to receive data describing sustainability aspects of those goods and the related transactions and to generate reports relating that data to pre-defined sustainability criteria;
in which information is available via API for consumption by other systems, and feeds into two organic systems: an enterprise dashboard, integrated with artificial intelligence, that analyzes volumes and yields on the trace to identify and visually highlight outliers, and a consumer application or web page which uses product descriptions, an interactive map, and interactive content to engage consumers with full analytics provided to enterprise customers on a contractual basis.

2. The supply chain tracking platform of claim 1, in which when a transaction is initiated by an end-user using an application: a digital transactional credential is created based on the transaction request and the digital transactional credential is transmitted to a producer via another application.

3. The supply chain tracking platform of claim 1, in which multiple categories of goods and/or multiple consumers are tracked simultaneously.

4. The supply chain tracking platform of claim 1, in which supply chain transactions are extracted and mapped out within the reporting layer.

5. The supply chain tracking platform of claim 1, in which, when the purchase of goods has been authorised within the blockchain layer, an interactive map of a journey of the goods is generated.

6. The supply chain tracking platform of claim 1, in which a journey of the goods includes any transactional events relating to the goods from the purchase transaction request to the delivery of the goods.

7. The supply chain tracking platform of claim 1, in which the reporting layer feeds data into a dashboard or application or a web page.

8. The supply chain tracking platform of claim 1 in which the blockchain-layer is configured to enable multiple traces to be run in parallel, or simultaneously, or consolidated.

9. The supply chain tracking platform of claim 1 in which the blockchain-based layer is configured to enable the results of one or more traces or other analytics to be overlaid onto a map.

10. The supply chain tracking platform of claim 1, in which an authorization or confirmation of a transaction is given when a set of pre-defined rules have been satisfied, such as the payment of the goods has been received or the pre-defined sustainability criteria has been satisfied.

11. The supply chain tracking platform of claim 1, in which an authorization or confirmation of a transaction is input by a producer into an application.

12. The supply chain tracking platform of claim 1, in which an authorization or confirmation of a transaction is stored on a producer's application.

13. The supply chain tracking platform of claim 1, in which an end-user is any party in the supply chain connected to a producer.

14. The supply chain tracking platform of claim 1, in which a self-sovereign identity certificate is used to access the blockchain.

15. The supply chain tracking platform of claim 1, in which a digital transactional credential includes goods related metadata.

16. The supply chain tracking platform of claim 1, in which a digital transactional credential is verified by both a producer and an end-user.

17. The supply chain tracking platform of claim 1, in which any subsequent transaction events relating to the goods are recorded onto the blockchain.

18. The supply chain tracking platform of claim 1, in which a permanent digitized chain of transactions between each entities of the supply chain is recorded onto the blockchain.

19. The supply chain tracking platform of claim 1, in which each transaction output is calculated and recorded onto the blockchain.

20. The supply chain tracking platform of claim 1, in which both an end-user and producer are able to trace the goods journey via their own application.

21. The supply chain tracking platform of claim 1, in which the platform provides full end to end transparency on the provenance and journey of goods.

22. The supply chain tracking platform of claim 1, in which the blockchain layer is configured to enable all separate entities that are part of the supply chain to have separate permission levels attributed to them.

23. The supply chain tracking platform of claim 1, which enables multiple tracing, such as multiple products, or a product and payments, or all ingredients for a finished product.

24. The supply chain tracking platform of claim 1, which constitutes a universal data standard regardless of the identity of any specific producer or end-user.

25. The supply chain tracking platform of claim 1, in which the blockchain layer is configured to implement Incoterms smart contracts.

26. The supply chain tracking platform of claim 1, in which physical goods, references to digital certificates, and the exchange of currency, are tracked as if it were physical goods, and are tracked within the same contracting reference.

27. The supply chain tracking platform of claim 1, in which participants on the blockchain layer sign an agreement that a transaction reflecting a change of ownership between two participants, which is uploaded or referenced in both their respective accounts, a digital certificate signed by both parties, or a smart contract to that effect, is evidence of a written commercial agreement signed by the users involved and authorized by the company's directors, and therefore binding in the eyes of local law or arbitration.

28. The supply chain tracking platform of claim 1, in which a user can trace a chain using a reference code, a product, a location, and limit or filter the results returned by counterparty, digital certificate, facility certification, date range, number of steps from the reference, or type of facility/product.

29. The supply chain tracking platform of claim 1, in which the interactive content is any of the following: crowdfunding projects, wilds, social media content.

30. The supply chain tracking platform of claim 1, in which the producer is any of the following: a distributor, consolidator, exporter, importer, roaster, food processor, customs agent, retailer, consumer.

31. The supply chain tracking platform of claim 1, in which the authorization or confirmation of a transaction is input by a producer into an application running on their smartphone.

32. The supply chain tracking platform of claim 1, in which the digital transactional credential includes any of the following: goods, volume, price, quality.

33. A computer implemented method for tracking good related transactions, the method comprising:
 (i) processing, via a blockchain layer, agricultural goods related transactions within a supply chain; and
 (ii) receiving, via a reporting layer that sits on top of the blockchain layer, data describing sustainability aspects of those goods and the related transactions and generating reports relating that data to pre-defined sustainability criteria;
in which information is available via API for consumption by other systems, and feeds into two organic systems: an enterprise dashboard, integrated with artificial intelligence, that analyzes volumes and yields on the trace to identify and visually highlight outliers, and a consumer application or web page which uses product descriptions, an interactive map, and interactive content such as crowdfunding projects, wikis, and social media content to engage consumers with full analytics provided to enterprise customers on a contractual basis.

* * * * *